United States Patent [19]
Rakoff

[11] Patent Number: 5,886,894
[45] Date of Patent: Mar. 23, 1999

[54] CONTROL SYSTEM FOR AUTOMATED SECURITY AND CONTROL SYSTEMS

[75] Inventor: Steven Barnett Rakoff, North York, Canada

[73] Assignee: Chubb Security Canada, Inc., Mississauga, Canada

[21] Appl. No.: 413,035

[22] Filed: Mar. 28, 1995

[51] Int. Cl.$^6$ .............................. G05B 19/00; G05B 9/02
[52] U.S. Cl. ........................... 364/132; 364/146; 364/188
[58] Field of Search ..................................... 364/131–134, 364/184–187, 468, 474.11, 137, 138, 140, 141–147, 188, 189; 395/200.01, 200.02, 200.05, 200.06

[56] References Cited

U.S. PATENT DOCUMENTS

| | | |
|---|---|---|
| 3,614,738 | 10/1971 | Slavin . |
| 3,688,262 | 8/1972 | Liquori . |
| 4,591,967 | 5/1986 | Mattes et al. ............................. 364/132 |
| 4,955,305 | 9/1990 | Garnier et al. ...................... 364/167.01 |
| 4,959,713 | 9/1990 | Morotomi et al. . |
| 4,991,077 | 2/1991 | Kawasaki et al. . |
| 5,086,385 | 2/1992 | Launey et al. . |
| 5,255,197 | 10/1993 | Iida ......................................... 364/468 |
| 5,528,215 | 6/1996 | Siu et al. ................................. 364/133 |

*Primary Examiner*—Reba I. Elmore
*Assistant Examiner*—Thomas E. Brown
*Attorney, Agent, or Firm*—Ridout & Maybee

[57] ABSTRACT

A security or automation system for domestic or business premises has plural units connected into a network by a communications bus, the units including one master unit and at least one user interface unit remote from the master unit that interprets and responds to forms, containing information for display, data capture, annunciation and timeout specification, as stored in and transmitted from the master unit. The system may be expanded by one or more application units, which have their own forms that are transmitted to the user interface unit, in order to communicate with the user and using a common format specified for the system and interpreted by the user interface, in order for the application unit to display data on and capture data from the user interface so that it may enhance its own operation and that of master unit through communications provided by a communications protocol managed by the master unit. The system may be further expanded by slave units used to capture inputs from sensors and actuate outputs, and issue messages to the master unit and receive messages from the master unit.

5 Claims, 18 Drawing Sheets

CONTROL SYSTEM FOR AUTOMATED SECURITY AND CONTROL SYSTEMS

FIELD OF THE INVENTION

This invention relates to the control and programming of home and commercial electronic security and monitoring systems, and home automation systems.

BACKGROUND OF THE INVENTION

Computer based control of such systems has long been known, and has reached a considerable level of sophistication, as exemplified by U.S. Pat. No. 5,086,385 (Launey et al). A concern with such systems is to provide a capability for exercising a range of monitoring and control functions through peripheral units of widely differing types, as well as providing for future expansion of the system to allow for additional peripherals, possibly of types not contemplated when the system was originally designed. Any attempt to provide a wholly comprehensive control program to provide for all anticipated eventualities will result in a complex program and system which is difficult to program and maintain. Even then, new types of peripherals will still require reprogramming, while if the program is simplified to provide only for installed peripherals, expansion of the system will always require a revised control program.

SUMMARY OF THE INVENTION

It is an object of the present invention to provide a system for security, monitoring and home automation applications which circumvents the necessity for highly complex control systems or for reprogramming to accommodate system expansion of new types of peripherals, yet can maintain ease of operation.

A further object is to provide a minimum of resources in the master unit, reducing the cost of the master unit while still allowing for expansion. This allows a family of products to cover a spectrum of markets.

According to the invention, a security or automation system for domestic or business premises comprises plural intercommunicating units, each having its own microprocessor and at least some of the units managing resources useful to the system, the units being connected into a network by a communication bus, the system comprising a master unit and at least one slave unit; the at least one slave unit including at least one user interface unit which is located remote from the master unit and which provides a user interface to the system for entry of commands and data and the display of data; the resources of at least one unit in the system comprising sensor inputs and control outputs for implementing security or automation; the microprocessor of the master unit being programmed to manage communications between units comprised in the system over the communication bus, according to a protocol consisting of the passage of addressed messages routed over the bus by or via the master unit to any of the slave units and the passage of addressed messages by the slave units to or via the master unit over the bus in response to such messages; the microprocessor of each unit having resources being programmed to manage and report on its own resources according to data exchanged in messages passed over the network between a user interface unit and the unit managing the resources, under control of the master unit.

SHORT DESCRIPTION OF THE DRAWINGS

DESCRIPTION OF THE PREFERRED EMBODIMENT

Figure 1:
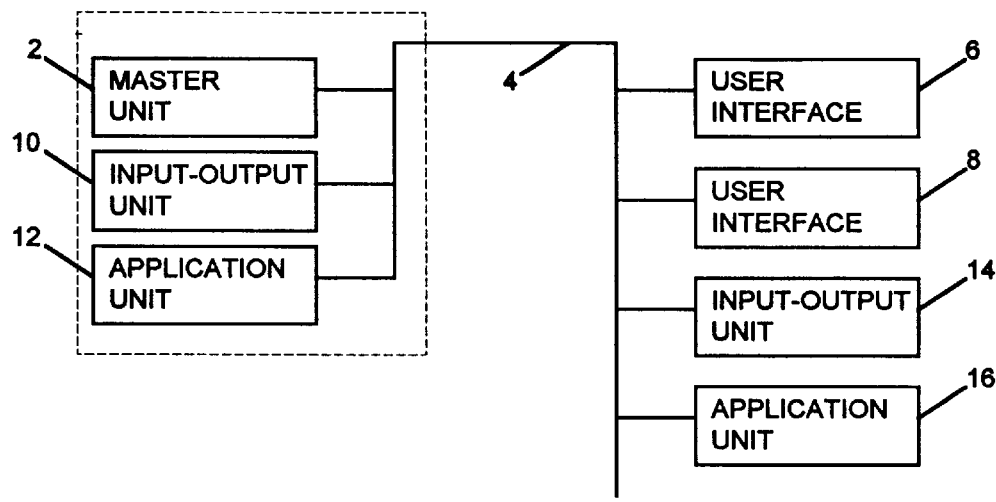
FIG. 1 is a schematic block diagram of an exemplary system in accordance to the invention.

Referring to FIG. 1, a home or commercial security installation is shown, comprising a master unit 2, and a number of slave units connected with the master unit through a serial communication bus 4. The slave units provide three general categories of function, units 6 and 8 providing user interfaces through which data and commands may be entered into and data read from the system, slave units 10 and 14 providing sensor input and control outputs and slave units 12 and 16 providing application expansion. The slave units may be modules such as units 10 associated directly with the master unit 2 to provide expansion of its facilities, or units such as the units 6, 14 and 16 located remotely from the master unit. All of the units are "intelligent" microprocessor controlled units, any of which may in practice, and in the described examples do, implement functions in more than one of the categories of interface, input-output or application expansion. The microprocessor functions of the units may conveniently be implemented by microcontrollers which integrate microprocessor with peripheral and memory functions. In a security system, the inputs may be from sensors of any known type such as sensors for the condition of doors or windows, motion sensors, infrared sensors, smoke and gas detectors, etc., and the outputs may be to alarms of various types, lock releases or actuators, and so on. In a home automation system, inputs may include condition inputs from temperature sensors and household equipment and appliances, and control outputs to furnaces, appliances, lights and so on. The details of these inputs and outputs form no part of the invention per se, and it is assumed that the addressee of this specification is familiar with the techniques and terminology utilized in relation to electronic security systems.

In a preferred embodiment, the bus 4 is a four conductor bus, comprising a pair of conductors providing a serial connection between units in accordance with the RS485 standard, which allows up to 32 units on a single bus, and a further pair of conductors providing a 12 volt direct current power supply to units either lacking or temporarily deprived of a local power supply. The serial connection operates, in the example described, at 19200 baud.

The master unit 2 acts as a network controller, supervising communication between the slave units and the master unit, which communications may be either communications between the master unit and a user interface, communications between the master unit and a slave unit in relation to the inputs or outputs which the latter controls, or communications between the master unit and slave units in relation to application expansion.

Figure 2:
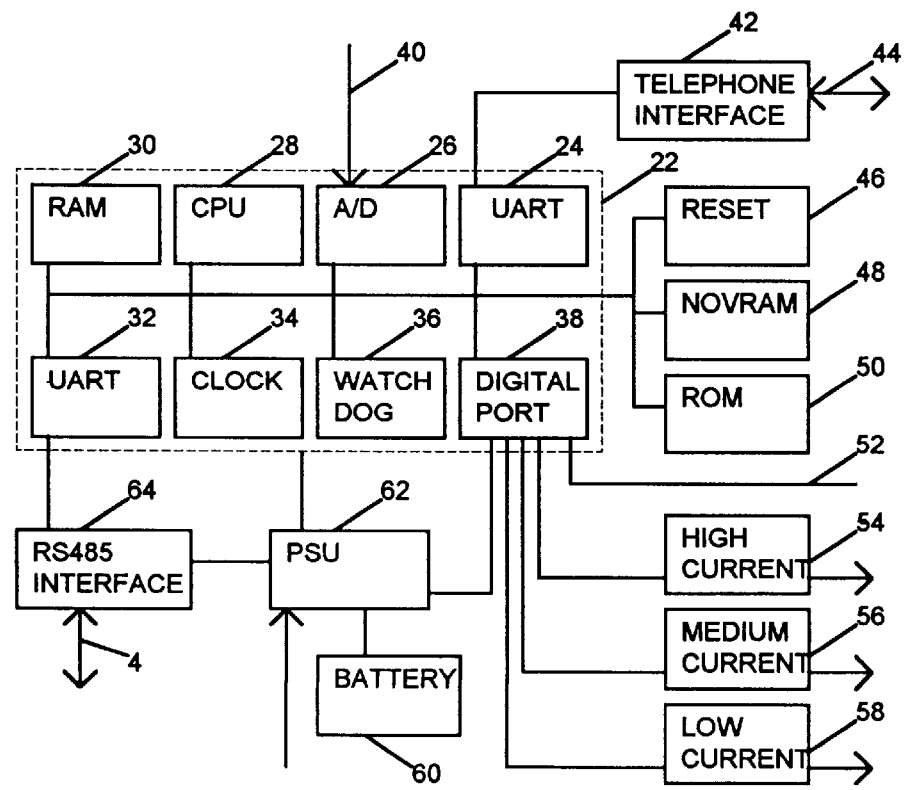
FIG. 2 is a schematic block diagram of the master unit as shown in FIG. 1.
Figure 3:
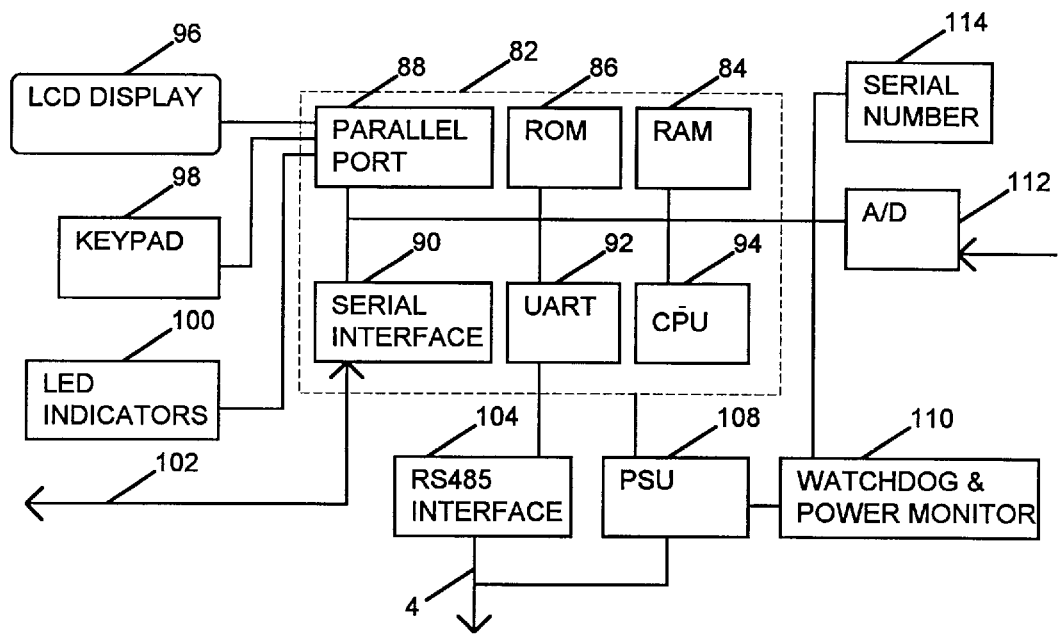
FIG. 3 is a schematic block diagram of the user interface unit as shown in FIG. 1.

Exemplary circuits for the master unit and for a user interface 6 are shown in FIGS. 2 and 3. The slave units 10 and 12 are basically similar to the unit 2 except that they lack features (such as an LCD display or keypad) specifically related to the user interface, and may instead control additional inputs and outputs provided with suitable interfaces according to the application of the unit: their programming is altered accordingly.

Referring to FIG. 2, the master unit comprises a central processing unit (CPU) 28 connected to various peripherals and peripheral interfaces; in the example shown many of these are integrated into a microcontroller chip 22, in this case the MC68HC11A0 from Motorola. The CPU operates under control of a program stored in read only memory 50, utilizing random access memory 30, and referencing parameters and storing data in further random access memory 48 rendered non-volatile by capacitor backup. Conventional watchdog and reset circuits 36 and 46 are provided to verify proper operation of the microcontroller and reset it at startup or in the event of problems. A time of day clock 34 provides a time reference to the CPU. The microcontroller 22 and other peripherals are powered by a line operated power supply 62, backed up by a rechargeable battery 60, the power supply also providing the power supply pair of bus 4.

A data connection between the CPU 28 and the bus 4 is provided through a serial interface (UART) 32 of the microcontroller, and RS485 interface 64. A connection to an external telephone line 44 is provided through an UART 24 of the microcontroller and a telephone interface 42.

An interface 40 to eight point inputs is provided by an eight channel analog to digital converter 26 incorporated into the microcontroller, while a digital (parallel) port 38 of the microcontroller provides outputs 54, 56 and 58 provided respectively with low, medium and high current drivers, as well as inputs which monitor the condition of fuses in the power supply 63 and the medium and high current outputs 56 and 54. These inputs and outputs are directly controlled by the microcontroller.

Referring now to FIG. 3, the user interface unit 6 is based on a microcontroller 82, in this example an 80C52 from Intel and other manufacturers. The unit has a power supply 108 which receives unregulated power from the bus 4. The microcontroller 82 has a CPU 94, a control program stored in read only memory 86, working RAM 84, and external watchdog and power monitor circuits 110. A serial number chip 114 is provided which can be interrogated to provide unique address identification of the unit. Additionally, a further serial interface 90 provided by the chip may be utilized for expansion of the unit by addition of further peripheral functions.

The microcontroller further provides a parallel port 88 which is utilized to provide a user interface. This parallel port provides data to control a liquid crystal two line alphameric display or LCD 96, control signals to scan the keypad 98 and outputs to light emitting diode indicators 100.

Such an interface unit may be utilized for programming the system, in which case suitable capabilities are included in the central program. Alternatively such a unit, or some other suitably programmed computer may be suitably attached to the bus 4 to configure the system and thereafter removed. For security reasons, user interface units should be located remotely from the master unit 2, since such units must be user accessible, while the master unit should be in a secure location, preferably close to the point of entry into premises of external connections such as telephone and power lines so as to minimize the risk of interference with such connections.

In variants (not shown) of the user interface of FIG. 3, the LCD display 96 and keypad 98 may be replaced either by a display in the form of an array of light emitting diode indicators and associated keypad, by a voice annunciation system and keypad (optionally through the local telephone handset and keypad) or through a remote controlled keypad without any form of annunciation other than those provided by outputs from slave units 10. The limited or non-existent display renders such a unit unsuitable for programming the system, and it is not therefore provided with this capability.

Figure 4:
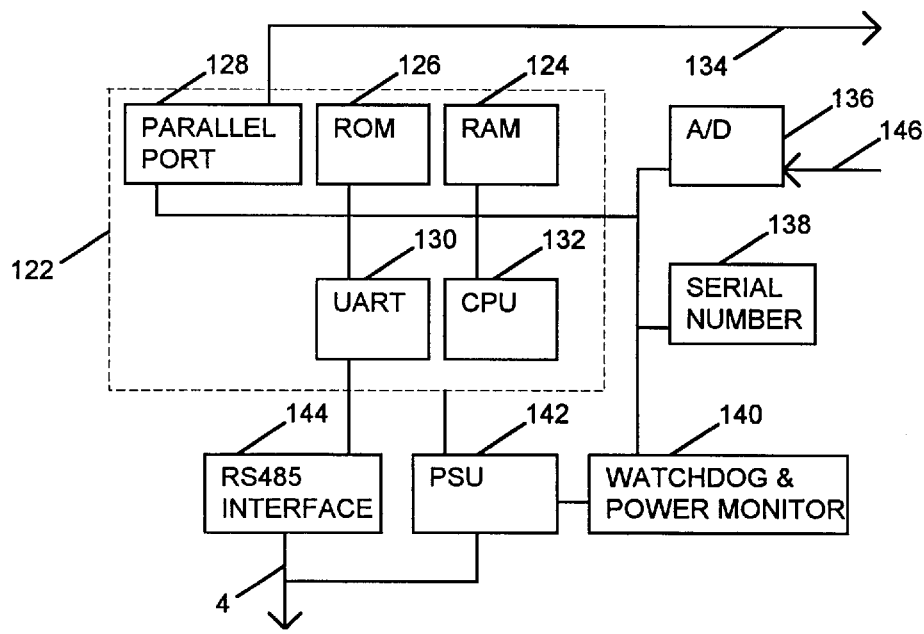
FIG. 4 is a schematic block diagram of the input-output unit as shown in FIG. 1.
Figure 5:
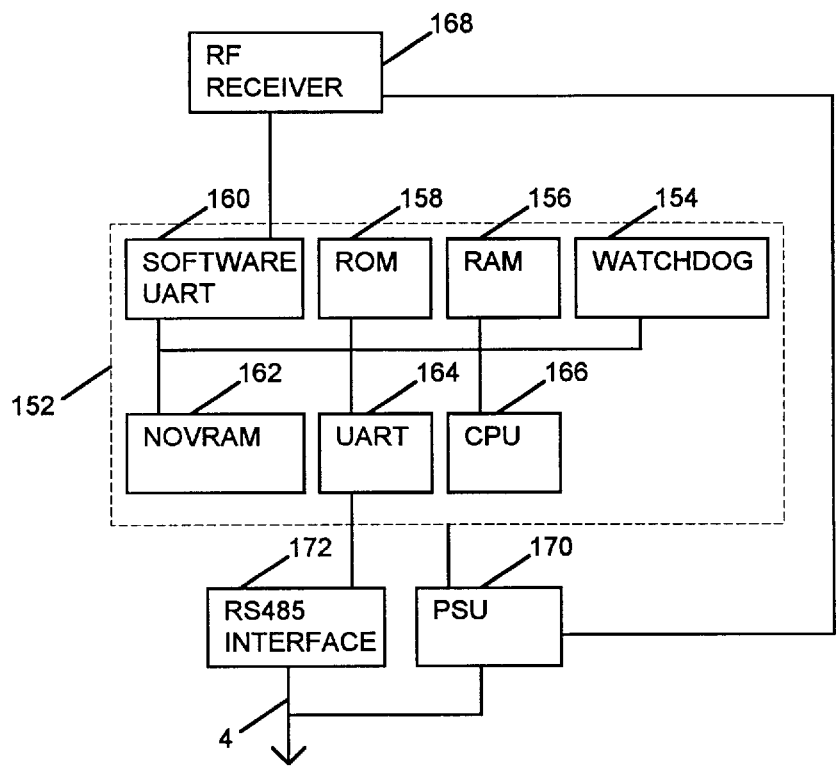
FIG. 5 is a schematic block diagram of the application unit as shown in FIG. 1.

Other slave units, as illustrated in FIG. 4 and FIG. 5, are similar, but user interface components, i.e. the LCD display and the keypad, are replaced by further sensor inputs 146 and control outputs 134, or in the exemplary application unit of FIG. 5 by an RF receiver 168. Other facilities such as watchdogs 140 and 154, UART's 130 and 164, power supply units (PSU) 142 and 170, RAM 124 and 156, etc., are also provided in the slave units.

Figure 6:
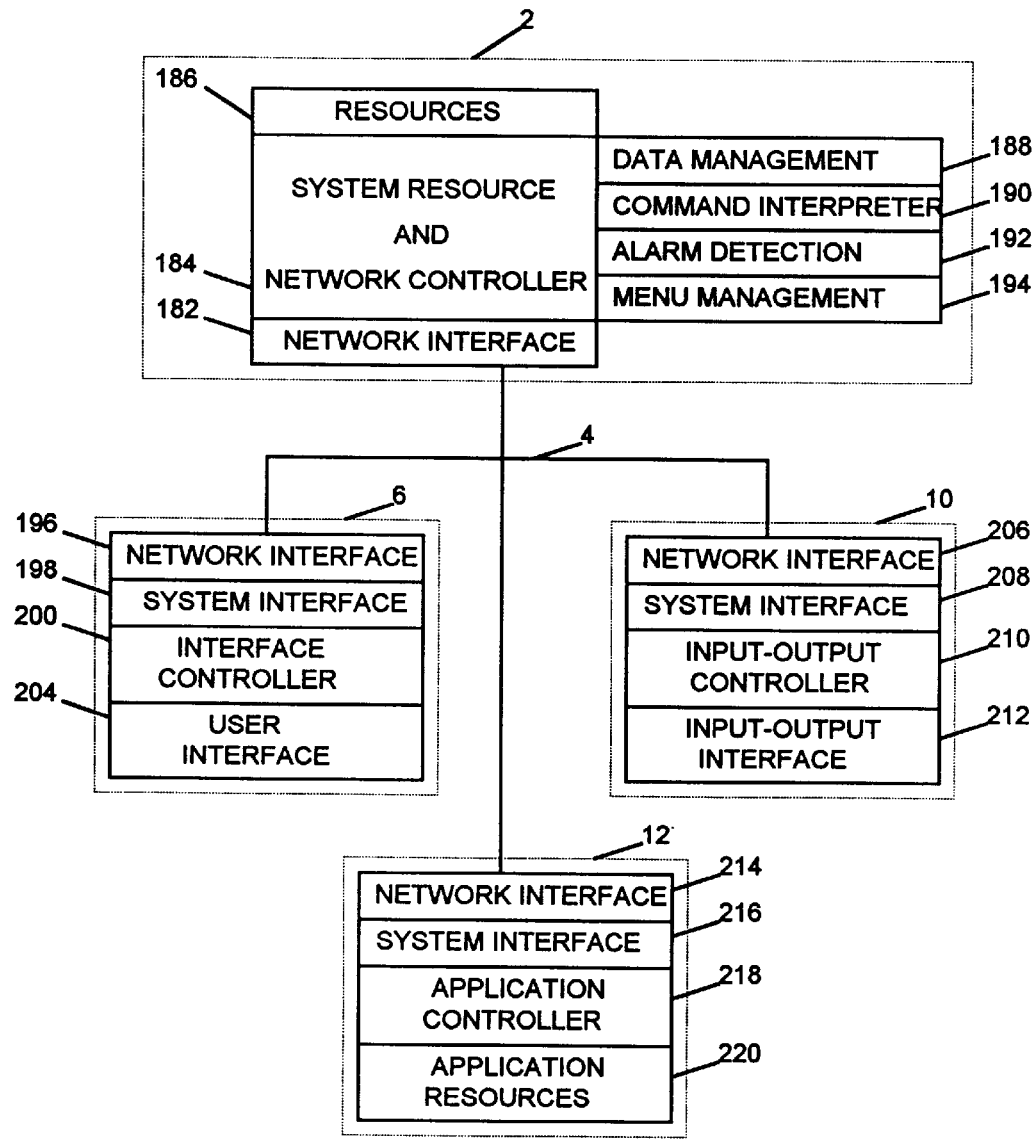
FIG. 6 is a schematic illustration of the program structure of the system.

Referring to FIG. 6, the control program of each unit provides routines (184, 200, 210 and 218) for control of its own resources, namely a user interface 204 if the present, sensor inputs and control outputs (186 and 212), and application interfacing (220) in a manner appropriate to those resources. Such routines are well understood in the art, and form no part of the present invention. Such control routines however require an interface, in this case provided by a system interface 184, 198, 208 or 216, to provide configuration information and accept output data in the case of sensor inputs and control outputs, and to format input and output data in the case of a user interface. The control program of each unit having such resources will provide these functions, as well as routines forming a network interface 196, 206 or 214 transferring data to and from the bus 4. In the case of the master unit 2, routines providing a network controller 182 are also provided, the provision of these routines being what primarily characterizes a master unit.

Figure 7:
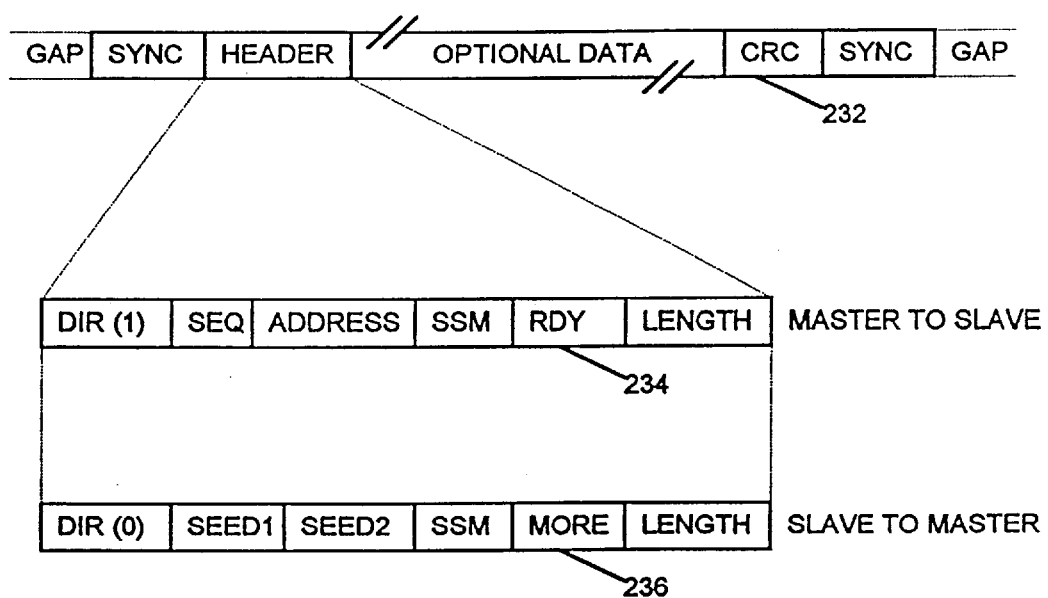
FIG. 7 shows the structure of message packets passed on the interconnecting bus as shown in FIG. 1.

Communications over the bus 4 between the master unit and the slave units are by means of messages of defined format as exemplified in FIG. 7. It shows the format of the messages, consisting of a starting synchronisation byte, a dual byte header, a variable length data field, a cyclic redundancy check (CRC) byte, and a terminal synchronization byte. The format of the header differs according to whether a message is directed from the master unit towards a slave unit, or from a slave unit towards the master unit. Messages from the master unit have a header format as in 234 and messages in the opposite direction have the format as in 236. In each case the first bit of the header is a direction indicator "DIR" (1 in master to slave and 0 in slave to master) and the final six bits represent the "LENGTH" of the data field (0–63 bytes). In 234 the second bit "SEQ" is a sequence number which may be zero or one, and the next six bits is the alias "ADDRESS" of a slave unit on the bus (this allowing for a theoretical 64 units, although certain numbers are reserved). The next bit "SSM" (in both 234 and 236) is set to specify the use of a specific protocol for data communication, discussed below, while the remaining bit "RDY" is used to signal to the addressed slave unit that it may proceed with a reply without waiting for a further message. Messages from the slaves to the master unit include a code formed by an encryption code sent by the master unit to the slave unit on start-up of the slave, this identifying the slave unit, and in this example consisting of two separately derived seeds "SEED1" and "SEED2", one of a single bit and the other of six bits. The "MORE" bit is set by a slave unit to indicate that it requires further communication with the master unit.

Figure 8:
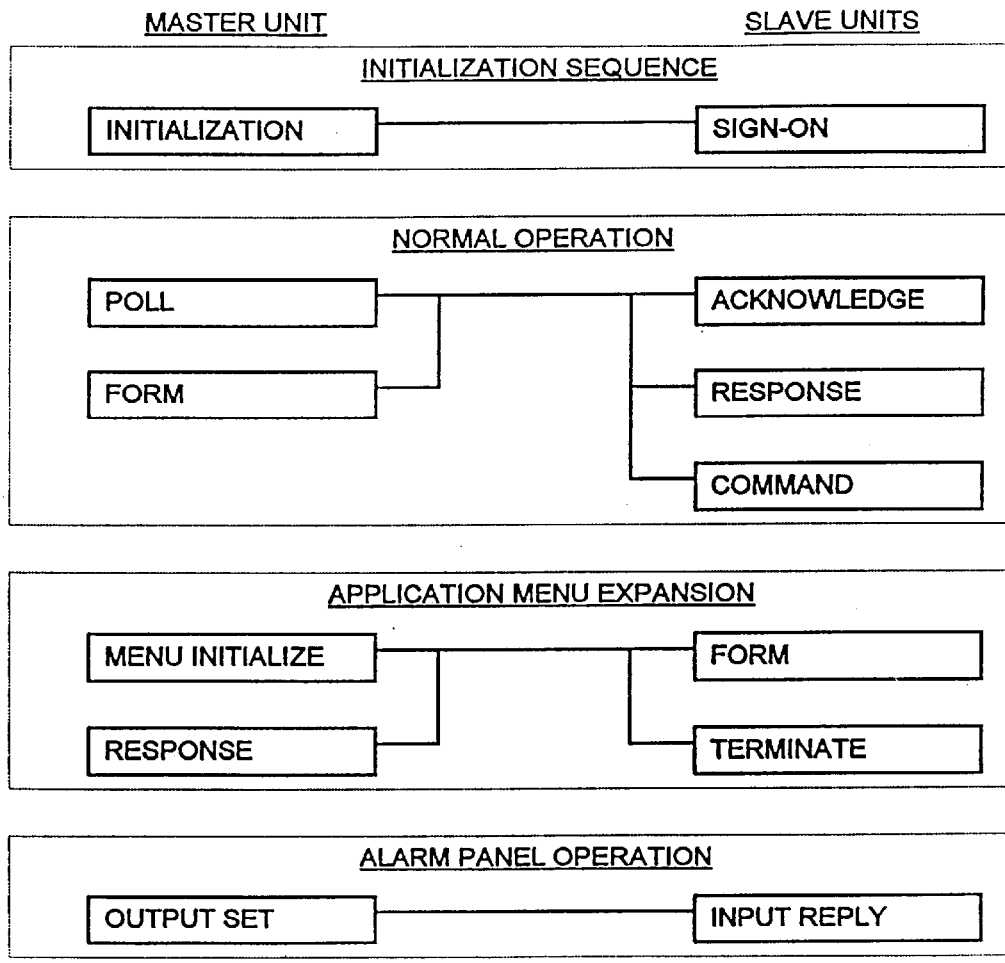
FIG. 8 shows the types of message packets passed on the interconnecting bus as shown in FIG. 1.

The optional data field may be of zero length in which case it represents, in the master-slave direction, a polling signal requesting a slave to report. If the slave has nothing to report, it responds with a message having a zero length data field by way of acknowledgment. If data is to be transmitted, the first byte of the data field represents a data type. According to the data type, the data field may contain further data, for example a byte identifying a unit to which the data relates, followed by 32 bytes of data, representing a "Form" containing or requesting data; or various other data formats as discussed further below. The data type byte also may be utilized as a vehicle for data: for example, different values may be associated with different keys of the keypad of a user interface 6 or 8 or to indicate a time-out in providing data for a form or a requirement to refresh a form. An exemplary set of data types is shown in FIG. 8. The data types shown on the left are types which may be sent by the master unit, while the data types on the right may be sent by slave units. It will be noted that some types appear on both sides; in these cases data is relayed by the master unit between slave units, for example between an application unit and a user interface unit.

The network packets are controlled by the master unit. Slave units are added to the master unit by sending an "Initialization" packet. A slave unit recognizes its address and responds with a "Sign-On" packet. From then on all communications between the master and slave unit are conducted through an alias, which is shorter than the slave's address. A temporary user interface may also be added to the system without the master unit needing to know the slave's address. This is done by the master unit polling all slave units in a special mode and only that user interface, which has a special code entered at its keypad by a user, responds and a temporary alias is established.

Once the alias of a slave unit is assigned, it forms part of the system. When the alias is established, an encryption and authentication key is also established. Once a second, a security or alarm panel operation is performed, where the master unit sends output information to the slave unit with an "Output Set" packet and the slave unit responds with any alarms or tampers detected with an "Input Reply" message. The processing of this information by the master unit forms the core of the security aspect of the system.

Between the above security operations, the system operates in a normal mode of operation. In this mode the master unit sends a "Poll" packet to a slave which may reply with either a "Response", a "Command" or an "Acknowledge" packet.

For a "Response" packet, sent when the user interface has completed a form, the master unit determines where the response is to be processed. This may be either in the master or application unit. Should the response be at the master unit, the menuing system there could either send the next "Form" packet to the user interface, or transfer the menuing system to an application unit, by sending a "Menu Initialize" packet to that slave unit. Here the application unit responds with a "Form" packet which is directed to the user interface unit through the master unit (which still remains master of inter-unit communications). At this stage the master unit determines that menu responses are performed by the application unit.

When a user interface sends a "Response" packet, and the response function had been determined earlier to reside in the application unit, the master unit directs the response to the application unit by redirecting the "Response" packet to it. The application unit processes the response and replies with either a new "Form" packet, again redirected to the user interface unit, or terminates its menu processing by replying with a "Terminate" packet. In the case of a "Terminate", control is again passed to the master unit's menuing system, which determines the new "Form" that is transmitted to the user interface.

The method described above of storing menu extensions or "Forms" in the application units and transferring them to user interface units forms the core of this invention.

In the case of a "Command", a command interpreter implemented by the control program of the master unit executes the commands.

Finally, once an acknowledge is received, the next slave unit is scanned in sequence. Once all slave units have been scanned, the scanning process starts again.

The core operations of the control program of the master unit in respect of the network control interface have been described above. In addition to serving the network interface, it performs a number of other functions. It maintains the real-time clock and miscellaneous timers, the modem interface used for reporting events such as alarms and tampers or for allowing configuration being downloaded from a remote computer, a file system used for configuration and the recording of states and events, as well as implementing the component interpreter for performing commands that may either set outputs or perform system functions depending on various conditions. The code of this command interpreter is stored in the master unit itself and is run once a second.

The master unit further performs tasks in response to the network interface such as running the alarm detection operation in response to an "Input Reply" message, running the menu operation in response to a menu "Response" packet resulting in a new "Form" message sent to the user interface unit or running the command interpreter in response to the "Command" packet.

Essentials of the control program will be apparent from the pseudo code listed below, comments are italicized while described procedures are underlined:

```
PROCEDURE Main: -- master unit
  Initialize_Hardware; -- Master unit
  Initialize_Variables; -- Local and Global
  Check_And_Initialize_File_System;
      -- reset configuration files if invalid checksum
  Enable_Interrupts; -- Starts the IO
  FOREVER DO;
    Check_Modem;    -- alarm reporting and/or
                    -- configuration up/down load
    Comms_Scan;   -- Process received message,
                    -- transmit next message
    IF End_Of_Second THEN -- once a second
      Update_All_Timers; -- those accurate to 1 second
      Command_Run; -- output language interpreter
      Set_Local_Outputs; -- 4
      Update_Area_States;
         -- Collect Inputs from last second
      Scan_System_Points;  -- master unit tamper, comms,
                            -- battery, etc.
      Process_Alarms; -- if any for the system points
      Scan_Local_Inputs; -- 8 local analogue inputs
      Process_Alarms; -- if any for the 8 local inputs
    END IF;
    IF End_Of_Minute THEN
      Update_Real_Time_Clock;
         -- displays accurate to 1 minute
    END IF;
  END FOREVER;
END PROCEDURE Main.
PROCEDURE Comms_Scan:
  IF Comms_Still_Busy THEN RETURN; -- to main loop
  IF Comms_State <> Comms_Start THEN -- still busy with unit
    Comms_Unpack; -- check for errors and authentication
    IF Comms_Error THEN
      IF Third_Attempt THEN -- time to give up
        Check_For_Application_Unit;  -- external menus so
                                      -- graceful exit
        IF NOT Application_Running THEN Get_Next_Unit;
      ELSE
        Start_Serial_Transmission;  -- already packed from
                                     -- last attempt
        RETURN; -- exit back to main loop
      END IF;
    ELSE -- Success
      Check_For_Application_Unit; -- external menus
    END IF;
  END IF;
  -- At this stage either comms successful, failure or
  -- select next unit
  FOREVER;  -- search until next unit's comms,
             -- exit through RETURN
    CASE Comms_State; -- process one of the following
      Comms_Start;
      Comms_Sign_On;
      Comms_Form;
      Comms_Next_Form;
      Comms_Poll;
      Comms_Input_Reply;
    END CASE;
    IF Comms_State = Comms_Start THEN  -- unit processing
                                         -- complete
      Get_Next_Unit;  -- serially allocated in 2 phases:
                       -- IO and other
    ELSE
      Comms_Pack; -- including crc and encryption
      Start_Serial_Transmission;
      RETURN; -- exit the forever loop back to main loop
    END IF;
  END FOREVER;
END PROCEDURE Comms_Scan;
PROCEDURE Check_For_Application_Unit:
  IF Application_Running THEN
    Application_Running:= FALSE;
    IF Application_Instruction = "Command_Name" THEN
      Application_Command:= "Response_Name";
         -- back to local menus
    ELSE IF Application_Instruction = "Command_Transfer"
THEN
      IF Received_Buffer_Type = "Form" THEN
        Application_Instruction:= "Response_Transfer";
                                         -- back to UI
      ELSE -- terminate menu command from application unit
        Application_Instruction:= "Response_Terminate";
      END IF;
    ELSE -- menu initialization command
      Application_Instruction: = "Response_Transfer";
                                    -- send form back to UI
    END;
    -- Now either transfer back to local menus or to UI
    -- serving application
    IF Application_Instruction = "Response_Transfer" THEN
      Transfer_RxBuffer_To_TxBuffer; -- App to UI message
      Comms_State:= Comms_Form; -- expect ack form UI
    ELSE
      Process_Menus; -- local menus activated
      IF Application_Instruction = "Command_None" THEN
        Send Form_Message; -- to UI
        Comms_State:= Comms_Form; -- expect ack form UI
      ELSE
        -- Command requesting transfer to application unit
        Application_Running:= TRUE;
        Send_Command_Message; -- Name or Initialize Menu
        Comms_State:= Comms_Next_Form;
        -- ignored by Check_For_Application_Unit
      END IF;
    END IF;
  END IF;
END PROCEDURE Check_For_Application_Unit;
PROCEDURE Comms_Start:
  IF IO_Phase THEN  -- high priority security scan
                      -- once/per sec/per unit
    IF Unit_Online THEN -- offline units ignored
      Send_Tone_Output_Message;
      Comms_State:= Comms_Input_Reply;
                           -- expected message response
    END IF;
  ELSE IF Valid_Serial_Number OR
                                  Temporary_Configuration_Unit
THEN
    -- Valid units: configured units or temporary UI
    IF NOT Unit_Online THEN -- i.e. unit is offline so init
      IF Temporary_Configuration_Unit THEN
        Set_Temporary_Mode;
      ELSE
        Set_Configured_Serial_ID;
      END IF;
      Send_Initialize_Message;
      Comms_State:= Comms_Sign_On;
                        -- expected message response
    ELSE
      Send_Poll_Message; -- invite unit to respond
      Comms_State:=Comms_Poll; -- misc. responses expected
    END IF;
  END IF;
END PROCEDURE Comms_Start;
PROCEDURE Comms_Sign_On:
  IF Message_type = "Sign_On" THEN
    IF Was_Application_Running THEN   -- there was an active
                                        -- UI to App link
      Application_Running:= TRUE;
      Send_Refresh_Response_Message;
         -- get same form as last time
      Comms_State:= Comms_Next_Form;
      -- dummy routine caught by Check_For_Application_Unit
```

-continued

```
    ELSE -- Local menus were running (default)
        Process_Menus; -- local menus activated
        IF Application_Instruction = "Command_None" THEN
            Send_Form_Message; -- to UI
            Comms_State:= Comms_Form; -- expect ack form UI
        ELSE
        -- Command requesting transfer to application unit
        -- either name request or menu initialization request
            Application_Running:= TRUE;
            Send_Command_Message; -- Name or Initialize Menu
            Comms_State:= Comms_Next_Form;
            -- dummy routine caught by Check_For_Application_Unit
        END IF;
        END IF
    ELSE
        Comms_State:= Comms_Start; -- forces next unit
    END IF;
END PROCEDURE Comms_Sign_On;
PROCEDURE Comms_Form:
    IF Message_Type <> "Ack" THEN
        Unit_Online:= FALSE;
        -- error so force re-initialization
    END IF;
    Comms_State:= Comms_Start; -- next unit
END PROCEDURE Comms_Form;
Comms_Next_Form:
    -- dummy routine caught by Check_For_Application_Unit
END Comms_Next_Form;
PROCEDURE Comms_Poll:
    IF Message_Type = "Ack" THEN
        Comms_State:= Comms_Start; -- next unit
    ELSE IF Message_Type = "Form Response" THEN -- from UI
        IF Timeout_Response THEN
            Was_Application_Running:= FALSE;
        END IF;
        IF Was_Application_Running THEN    -- redirect response to
                                           -- application unit
            Application_running:= TRUE;
            Transfer_RxBuffer_To_TxBuffer; -- UI to App message
            Application_Instruction:= "Command_Transfer";
                                           -- redirect back to UI
            Send_Response_Message; -- to application unit
            Comms_State:= Comms_Next_Form;
            -- dummy routine caught by Check_For_Application_Unit
        ELSE -- Local menus
            Process_Menus; -- local menus activated
            IF Application_Instruction = "Command_None" THEN
                Send_Form_Message; -- to UI
                Comms_State:= Comms_Form; -- expect ack form UI
            ELSE
            -- Command requesting transfer to application unit
                Application_Running:= TRUE;
                Send_Command_Message; -- Name or Initialize Menu
                Comms_State:= Comms_Next_Form;
            -- dummy routine caught by Check_For_Application_Unit
            END IF;
        END IF
    ELSE IF Message_Type = "Command" THEN
        Run_Command;
        Comms_State:= Comms_Poll; -- ack or new command
    ELSE -- error
        Unit_Online:= FALSE;
        Comms_State:= Comms_Start; -- next unit
    END IF;
END PROCEDURE Comms_Poll;
PROCEDURE Comms_Input_Reply:
    IF Message_Type = "Input Reply" THEN
        Process_Alarms;   -- if any, for any input points
                          -- from slave units
    ELSE -- unexpected reply, force failure
        Unit_Online:= FALSE;
    END IF;
    Comms_State:= Comms_Start; -- next unit
END PROCEDURE Comms_Input_Reply;
PROCEDURE Process_Menus:
    Restore_Context;   -- load and decompress all
                       -- necessary variables including
                       -- "Menu_Pointer" (one context per UI)
    -- The Menu_Pointer determines the routine in a table that
    -- is run dependent on the response.
    -- The selected routine could:
    -- ... issue a command (e.g. turn an area on) or
    -- ... get information (e.g. to display an areas state) or
    -- ... select a new Menu_Pointer or
    -- ... some or all of the above
    IF Error OR Timeout THEN
        Construct_First_Form;
        Application_Command:= "Command_None";
    ELSE IF Application_Command = "Response_Name" THEN
        Application_Command:= "Command_None";
        Build_Form_With_Application_Name;   - as received from
                                             -- application unit
    ELSE
    -- local menu processing or "Response_Terminate" processing
    -- from an application unit
        Process_Response;
    -- The Menu_Pointer determines the routine in a table that
    -- is run dependent on the response.
    -- The selected routine could:
    --     ... issue a command (e.g. turn an area on) or
    --     ... get information (e.g. to display an area state)
    --     ... or select a new Menu_Pointer or
    --     ... request a name of an application unit or
    --     ... request that a menu be run from an application
    --     ... unit or some of the above
        IF Application_Name_Needed THEN
            Application_Command:= "Command_Name";
            -- requested from an Application Unit
        ELSE IF Application_Name_Selected THEN
            Application_Command:= "Command_Initialize_Menu";
            -- e.g. Status, Configuration, etc.
        ELSE
            Build_Next_Form; -- dependant on new menu pointer
            Application_Command:= "Command_None";
        END IF;
    END IF;
    Save_Context; -- compress and save all necessary variables
END PROCEDURE Process_Menus;
```

The architecture of the system of the invention provides a substantial measure of distributed processing such that the control program of master unit 2 can be relieved of functions which are specific to the sensor inputs or control outputs of the system, or the functionality of the slave units, other than such parts of its control program as are required by its own local inputs and outputs; likewise routines only relevant to the user interface units, either during normal operation, or during configuration when using a unit 6 capable of such configuration, need be provided only in the control programs of user interface units.

There are three generic types of slave units, the user interface, the input-output and the application unit. In actual practice, a slave unit may combine one or more types of generic slave unit.

The user interface operation centres around interpreting the "Form" sent by the master unit. This is done by displaying the form on the liquid crystal display unit and modifying it, if necessary, in response to keyboard key selections. Once the form has been completed, either after pressing designated key(s) or by a timeout, the "Response" is sent to the master unit. The user interface then waits until another form is received from the master unit and the procedure then repeats itself.

The pseudo code of the user interface is described below:

```
PROCEDURE MAIN: -- of user interface slave unit
    FOREVER -- endless loop
        Initialize_Hardware;
        Retrieve_Serial_ID; -- unique address for unit
        Alias:= 0;   -- Invalid: set by master unit when
```

```
                                  -- comms established
         RS485_Mode:= "Reception";
         UART_Mode:= "Reception"
         WHILE Alias = 0 DO
                  -- poll until alias set by master unit
             Temp_Mode:= FALSE;
             Prompt_For_Temp_Mode;
                  -- set temp mode / password form
             REPEAT
                 Process_Form; -- i.e. check for password
                 IF Password = "24822" THEN
             -- code needed to enter temporary UI mode
                   Temp_Mode:= TRUE; -- for 2 seconds
                 END_IF;
                 Update_Timers_And_Scan_IO;
             UNTIL (Temp_Mode = FALSE) OR (Alias <> 0);
         END WHILE; -- master unit sent alias
         Temp_Mode:= FALSE;   -- cannot enter temp mode until
                                  -- comms is lost
         REPEAT
             Update_Timers_And_Scan_IO;
             IF Form_Mode = "New" THEN -- sent by master unit and
                                         -- set by interrupt
                Display_Form_On_LCD;  -- translate special codes
                                         -- as needed
                Initialize_Form_Variables_And_Modes;
                                       -- as needed by Process_Form
                Form_Mode:= "Running";
             END IF;
             IF Form_Mode = "Running" THEN
                Process_Form;
             END IF;
             UNTIL Comms_Fail; -- i.e. when comms lost for 5 secs
         END FOREVER;
      END PROCEDURE Main.
      PROCEDURE Process_Form:
         IF (Refresh_Timeout = 0) OR (Form_Timeout = 0) THEN
             Form_Mode:= "Done";
         ELSE IF Return_All_Keys_Mode THEN
             IF Key <> "None" THEN
                Form_Mode:= "Done";
             END IF;
         ELSE IF Key = "ESC" THEN
             Form_Mode:= "Done";
         ELSE IF Cursor <> 0 THEN -- input on form
             CASE Key OF
                "Left": BEGIN
                    IF Form[Cursor] = "Input" THEN
                       Cursor:= Previous_Input_Position;
                               -- hold if already at first position
                    END IF
                END "Left";
                "Right": BEGIN
                    IF Form[Cursor] = "Input" THEN
                       Cursor:= Next_Input_Position;
                               -- hold if already at last position
                    END IF
                END "Right";
                "Softkey":
                    IF Softkey_Active THEN
                       Form_Mode:= "Done";
                    END IF;
                END "Softkey";
                "Numeric": -- zero and one through nine
                    Modify_Input_As_Required;
                    Update_LCD_Display;
                    IF Form[Cursor] <> "Alphanumeric" THEN
                       -- alphanumeric inputs do not have
                       -- automatic cursor movement
                       Old_Cursor:= Cursor;
                       Cursor:= Next_Input_Position;
                       -- hold if already at last position
                       IF (Old_Cursor = Cursor) AND (Form[Cursor] =
                                                "Password")
      THEN
                          -- last input of password forces
                          -- automatic form return
                          Form_Mode:= "Done";
                       END IF;
                    END IF;
                    END "Numeric";
                END CASE;
                Form_Key:= "None";
             END IF;
         END PROCEDURE Process_Form;
         PROCEDURE Update_Timers_And_Scan_IO:
             IF Elapsed_40_Milliseconds THEN
                Sample_One_Of_Five_Input_Points;  -- from the A/D:
                                                   -- alarms and tampers
                Move_To_Next_Input_Point;  -- effective 200ms scan
                                            -- per input point
             END IF;
             IF Elapsed_200_Milliseconds THEN
                Sample_Tamper_Input; -- of the unit itself
                Output(Output_State); -- i.e. set the output points
             END IF;
             Update_Tones_Depending_On_Cadence;
                                   -- as requested through comms
             Scan_Keypad;  -- determine Function, Panic and
                            -- Regular menu keys
             Update_Miscellaneous_Counters_And_Timers;
         END PROCEDURE Update_Timers_And_Scan_IO;
         PROCEDURE Serial_Interrupt_Handler:
             -- interrupts when UART is ready
             IF UART_Mode = "Reception" THEN
                -- Build buffer between synchronization characters
                -- Remove substitution characters on the fly
                -- Decrypt on the fly if not initialization packet
                -- Update CRC on the fly
                IF Correct_CRC And Correct_Length THEN
                   IF Alias_In_Buffer = Alias THEN
                      RS485_Mode:= "Transmission";
                      Addressed_Packet_Received;
                      UART_Mode:= "Transmission";
                          -- of packet back to master unit
                   ELSE IF Initialization_Packet THEN
                      IF (Address_In(Buffer) = Serial_ID) OR
                         (Temp_Mode AND Temp_Request_In(Buffer))
             THEN
                      RS485_Mode:= "Transmission";
                      Set_Encryption_Seed;
                      -- also used for decryption
                      Set_Substitution_Detection_Seeds;
                      Set_Circuit_Type; -- as needed for inputs
                      Set_Sequence;  -- needed to determine if
                                      -- packets are acknowledged
                      Alias:= Alias_Field_Of(Buffer);
                      Buffer:= Serial_ID;  -- used as acknowledge of
                                             -- initialization sequence
                      UART_Mode:= "Transmission";
                                      -- of packet back to master
      unit
                   END IF;
                END IF;
             END IF;
             ELSE UART_Mode = "Transmission" THEN
                -- Wait one character length before transmitting first
                -- synchronization character. Encrypt and calculate the
                -- CRC on the fly. Transmit the buffer substituting
                -- characters including the CRC character. Transmit the
                -- final synchronization character. Wait one half char-
                -- acter after the final synchronization character has
                -- completely left the UART.
                RS485_Mode:= "Reception";
                UART_Mode:= "Reception"
             END IF;
         END PROCEDURE Serial_Interrupt_Handler;
         PROCEDURE Addressed_Packet_Received:
             IF Sequence <> Sequence_Field_Of(Buffer) THEN
                -- Previous packet was acknowledged
                Sequence:= NOT Sequence;
                       -- so acknowledge of this packet can be detected
                -- clear any alarms or tampers already transmitted
             END IF;
             CASE Type_Of_Packet(Buffer) OF
                "Form":
                    Form:= Buffer; -- transfer Buffer into to Form
                    Form_Mode = "New"; -- handled by foreground code
                    Buffer:= "Ack";
                    -- acknowledge message to master unit
```

-continued
```
    END "Form";
  "Output_Set":
    Output_State:= Buffer;
         -- get outputs states as sent by master unit
    Buffer:= "Alarms_Or_Tampers_Detected";
         -- send back to master unit
  END "Output_Set";
  "Poll": -- send any pending information to master unit
    IF Function_Keys_Marked_For_Transmission THEN
      Form:= "Function_Keys";
    ELSE IF Form_Mode = "Done" THEN
      Buffer:= Form;
         -- either single key response or whole form
    ELSE
      Buffer:= "Ack"; -- all ok
    END
  END "Poll";
  ELSE
    Buffer:= "Ack";
  END IF;
END CASE;
END PROCEDURE Addressed_Packet_Received;
```

An input-output unit 14 is used to detect and collect alarm and tamper information from input points and return the information to the master unit 2. Its outputs are conditioned by the master unit sending the "Output Set" message command. Input circuits are typically scanned and interpreted every 200 milliseconds and their results are latched, to be transmitted to the master unit once a second in the "Input Reply" packet (sent after receiving the "Output Set" poll). The latches are only cleared once the master unit acknowledges reception of the alarm or tamper and if the input point had returned to a normal state.

Exemplary pseudo coding of such an input-output unit 14 is set forth below:

```
PROCEDURE MAIN: -- of input-output slave unit
  FOREVER -- endless loop
    Initialize_Hardware;
    Retrieve_Serial_ID; -- unique address for unit
    Alias:= 0;  -- Invalid: set by master unit when
                -- comms established
    RS485_Mode:= "Reception";
    UART_Mode:= "Reception"
    REPEAT
      UNTIL Alias <>0;   -- wait until alias sent from master
                         -- unit through interrupt
      REPEAT
        Update_Timers_And_Scan_IO;
        UNTIL Comms_Fail; -- i.e. when comms lost for 5 secs
    END FOREVER;
END PROCEDURE Main.
PROCEDURE Update_Timers_And_Scan_IO:
  IF Elapsed_12_5_Milliseconds THEN -- 12.5 milliseconds
    Sample_One_Of_Sixteen_Input_Points;
         -- from the A/D: alarms and tampers
    Move_To_Next_Input_Point;
         -- effective 200ms scan per input point
  END IF;
  IF Elapsed_200_Milliseconds THEN
    Sample_Tamper_Input; -- of the unit itself
    Output(Output_State); -- i.e. set the output points
  END IF;
  -- update other miscellaneous counters and timers
END PROCEDURE Update_Timers_And_Scan_IO;
PROCEDURE Serial_Interrupt_Handler:
  -- interrupts when UART is ready
  IF UART_Mode = "Reception" THEN
    -- Build buffer between synchronization characters
    -- Remove substitution characters on the fly
    -- Decrypt on the fly if not initialization packet
    -- Update CRC on the fly
    IF Correct_CRC And Correct_Length THEN
      IF Alias_In_Buffer = Alias THEN
        RS485_Mode:= "Transmission";
        Addressed_Packet_Received;
        UART_Mode:= "Transmission";
          -- of packet back to master unit
      ELSE IF Initialization_Packet AND
              (Address_In(Buffer) = Serial_ID)
      THEN
        RS485_Mode:= "Transmission";
        Set_Encryption_Seed; -- also used for decryption
        Set_Substitution_Detection_Seeds;
        Set_Circuit_Type; -- as needed for inputs
        Set_Sequence; -- needed to determine if
                      -- packets are acknowledged
        Alias:= Alias_Field_Of(Buffer);
        Buffer:= Serial_ID;   -- used as acknowledge of
                              -- initialization sequence
        UART_Mode:= "Transmission";
          -- of packet back to master unit
      END IF;
    END IF;
  ELSE UART_Mode = "Transmission" THEN
    -- Wait one character length before transmitting first
    -- synchronization character. Encrypt & calculate the CRC
    -- on the fly. Transmit the buffer substituting characters
    -- including the CRC character. Transmit the final syn-
    -- chronization character. Wait one half character after
    -- the final synchronization character has completely left
    -- the UART.
    RS485_Mode:= "Reception";
    UART_Mode:= "Reception"
  END IF;
END PROCEDURE Serial_Interrupt_Handler;
PROCEDURE Addressed_Packet_Received:
  IF Sequence <> Sequence_Field_Of(Buffer) THEN
    -- Previous packet was acknowledged
    Sequence:= NOT Sequence;
    -- so acknowledge of this packet can be detected
    -- clear any alarms and tampers already transmitted
  END IF;
  CASE Type_Of_Packet(Buffer) OF
    "Output_Set":
      Output_State:= Buffer;
         -- get outputs states as sent by master unit
      Buffer:= "Alarms_Or_Tampers_Detected";
         -- send back to master unit
    END "Output_Set";
    ELSE
      Buffer:= "Ack";
    END IF;
  END CASE;
END PROCEDURE Addressed_Packet_Received;
```

There two main aspects of the operation of an application unit 16. The first is to extend the menus of the master unit as described earlier and the second is to perform a specific application itself, e.g. environmental control such as temperature and lighting, access control, communications, etc., or as in the case of the exemplary application unit shown in FIG. 5, reception and conditioning of radio transmitted input points.

The menu system may be used to either gather information from the user interfaces or display status on the user interface upon request. The application unit performs its specific operation. The application unit interacts with the master unit either through the "Output Set" and "Input Reply" packets or by the application unit issuing commands to the master unit in order to perform certain commands.

Exemplary pseudo-coding of such an application unit is set forth below:

```
PROCEDURE MAIN:
  -- of application slave unit, a radio receiver
```

```
            -- of input point transmitters
FOREVER -- endless loop
  Initialize_Hardware;
  Retrieve_Serial_ID; -- unique address for unit
  Alias:= 0;  -- Invalid: set by master unit when
              --         comms established
  RS485_Mode:= "Reception";
  UART_Mode:= "Reception"
  REPEAT
  UNTIL Alias <> 0;  -- wait until alias sent from master
                     -- unit through interrupt
    REPEAT
    -- An RF board receives and decodes radio transmissions.
    -- These are sent to the application unit which uses a
    -- secondary software UART.
      Transmit_Poll_To_Radio_Board;
          -- check to see if RF board has signal
      REPEAT
          Check_Radio_Board_For_Reception;
              -- build up received characters
      UNTIL RF_Response OR RF_Timeout;
      IF RF_Response AND RF_Packet_Ok THEN
          -- Valid format and checksum. Reformat packet to
          -- extract transmitter type and address.
          Sample_Tamper_Input;
              -- of the unit itself sent by RF board
          Current_Type:= Type_Of(RX_RF_PACKET);
          Current_Address:= Address_Of(RX_RF_PACKET);
          Current_Status:= Status_Of(RX_RF_PACKET);
          IF Current_Type= "Keypad" THEN -- rf keypad
              Keypad_Index:= Valid_Keypad_Address;
                  -- i.e. is keypad enrolled
              IF Keypad_Index <> 0 THEN -- i.e. valid keypad
                  Process_Keypad;
              ELSE IF Keypad_Enroll_Mode THEN
                  -- usually a bypass key being pressed
                  Keypad[Enroll_Number] := Current_Address;
                  Keypad_Enroll_Mode:= FALSE;
              END IF;
          ELSE IF Current_Type= "Sensor" THEN
              -- RF input points, panic buttons, etc.
              Sensor_Index:= Valid_Sensor_Address;
                  -- i.e. is sensor enrolled
              IF Sensor_Index <> 0 THEN -- i.e. valid sensor
                  Process_Sensor;
              ELSE IF Sensor_Enroll_Mode THEN
                  -- usually a tamper trigger
                  Sensor[Enroll_Number] := Current_Address;
                  Sensor_Enroll_Mode:= FALSE;
              END IF;
          END IF;
      END IF;
      Update_Miscellaneous_Timers;
    UNTIL Comms_Fail; -- i.e. when comms lost for 5 secs
  END FOREVER;
END PROCEDURE Main.
PROCEDURE Update_Miscellaneous_Timers:
  FOR Sensor_Index:= 1 TO LAST_SENSOR DO
    IF Sensor[Sensor_Index] .Configuration = "Supervise" THEN
Decrement(Sensor_State[Sensor_Index] .Supervision_Timer);
          -- down to 0
      IF Sensor_State[Sensor_Index] .Supervision_Timer = 0
THEN
          Sensor_State:= "Tamper";
              -- supervision failure treated as tamper
          Process_Sensor; -- for further processing
      END IF;
    END IF;
  END FOR;
  -- Update other timers such as the enroll mode timeout
END PROCEDURE Update_Miscellaneous_Timers;
PROCEDURE Process_Keypad:
  Check_Battery_State;  -- a low battery state would be sent
                        -- to the master unit
  IF Panic_Key_Pressed THEN
      Sensor_Index:= Keypad[Keypad_Index] .Panic_Sensor_Map;
          -- panic detected as a sensor
      Sensor_State:= "Alarm"; -- simulate alarm
      Process_Sensor; -- for further processing
  ELSE IF Regular_Key_Pressed THEN
      -- Collect keys checking for keypress timeout
      IF Valid_Instruction THEN
          -- ID+PIN then instruction selected
          Command_Instruction: = "ID+PIN+Instruction";
          -- returned to master unit on poll
      END IF;
  END IF;
END PROCEDURE Process_Keypad;
PROCEDURE Process_Sensor:
-- Adjust current state to reflect whether circuit normally
-- open or closed or if tampers are monitored. The battery
-- state is always monitored.
  Sensor_State[Sensor_Index] .State:=
      Adjust_State(Current_Status,
Sensor[Sensor_Index] .Configuration);
  Sensor_State[Sensor_Index] .Supervision_Timer:=
                          SUPERVISION_TIME; -- 2 to 24 hours
END PROCEDURE Process_Sensor;
PROCEDURE Serial_Interrupt_Handler:
  -- interrupts when UART is ready
  IF UART_Mode = "Reception" THEN
      -- Build buffer between synchronization characters.
      -- Remove substitution characters on the fly.
      -- Decrypt on the fly if not initialization packet.
      -- Update CRC on the fly.
      IF Correct_CRC And Correct_Length THEN
          IF Alias_In_Buffer = Alias THEN
              RS485_Mode:= "Transmission";
              Addressed_Packet_Received;
              UART_Mode:= "Transmission";
                  -- of packet back to master unit
          ELSE IF Initialization_Packet AND
                  (Address_In(Buffer) = Serial_ID)
THEN
              RS485_Mode:= "Transmission";
              Set_Encryption_Seed; -- also used for decryption
              Set_Substitution_Detection_Seeds;
              Set_Circuit_Type; -- as needed for inputs
              Set_Sequence;
              -- needed to determine if packets are acknowledged
              Alias:= Alias_Field_Of(Buffer);
              Buffer:= Serial_ID;
              -- used as acknowledge of initialization sequence
              UART_Mode:= "Transmission";
              -- of packet back to master unit
          END IF;
      END IF;
  ELSE UART_Mode = "Transmission" THEN
    -- Wait one character length before transmitting first
    -- synchronization character. Encrypt and calculate the CRC
    -- on the fly.Transmit the buffer substituting characters
    -- including the CRC character. Transmit the final
    -- synchronization character. Wait one half character after
    -- the final synchronization character has completely left
    -- the UART.
      RS485_Mode:= "Reception";
      UART_Mode:= "Reception"
  END IF;
END PROCEDURE Serial_Interrupt_Handler;
PROCEDURE Addressed_Packet_Received:
  IF Sequence <> Sequence_Field_Of(Buffer) THEN
      -- previous packet was acknowledged
      Sequence:= NOT Sequence;
      -- so acknowledge of new packet can be detected
      -- clear any alarms and tampers already transmitted
      -- clear any commands sent
  END IF;
  CASE Type_Of_Packet(Buffer) OF
      "Output_Set":  -- no outputs on this unit but used to
                     -- return alarms and tampers
          -- Collect alarms and tampers from all
          --      "Sensor_State[] .State"s
          Buffer:= "Alarms_Or_Tampers_Detected";
              -- send back to master unit
      END "Output_Set";
      "Poll":
          IF Command_Instruction <> "" THEN
              Buffer:= Command_Instruction;
                  -- as collected by keypad
          ELSE
```

-continued

```
        Buffer:= "Ack";
    END IF;
END "Output_Set";
"MenuStart":
    IF MenuType = "Name" THEN
        Buffer:= "Application Unit Name";
            -- RF in this case
    ELSE
    -- Determine menu type, set the initial menu context
    -- and get the menu form.
        Buffer:= Context + "Menu Form";
    END IF;
END "MenuStart";
"Response": -- from user interface
-- Restore context from master unit. Extract data from
-- response form. Update data and configuration as
-- needed. Determine either the next form or if the
-- menu path has terminated.
    IF Terminate_Menu THEN
        Buffer:= "Menu Terminate";
    ELSE -- send new form to user interface
        Buffer:= Context + "Menu Form";
            -- save context back to master unit
    END IF;
END "Response";
ELSE
    Buffer:= "Ack";
END IF;
END CASE;
END PROCEDURE Addressed_Packet_Received;
```

Use and configuration of the system is best further described with reference to the flow diagrams of FIGS. 9–20 illustrating how the system interacts with a user interface 6. It should be understood that because the system consists of a network of interacting units, the steps shown in the flow diagrams are performed by interaction of control programs running on multiple units, and do not merely represent activity of the unit 6; nor do the diagrams represent steps performed by control programs which are not reflected by the user interface. They do however exemplify the working of the system, and are largely independent of the configuration of the system which may vary from a minimal system consisting of a user interface unit 6 and a master unit 2 to a system including multiple user interface units and other slave units. It is assumed that a security system is being described, although security functions may be wholly or partially replaced by automation functions.

In order for the system to function, the master unit 2 must detect at least one user interface. For present purposes of description, it is assumed that an LCD user interface 6 is detected, since the limitations of the LED display make it (in the present example) unsuitable for configuring the system, or for monitoring multiple areas in a system divided into multiple areas each with its own interface.

Figure 9:
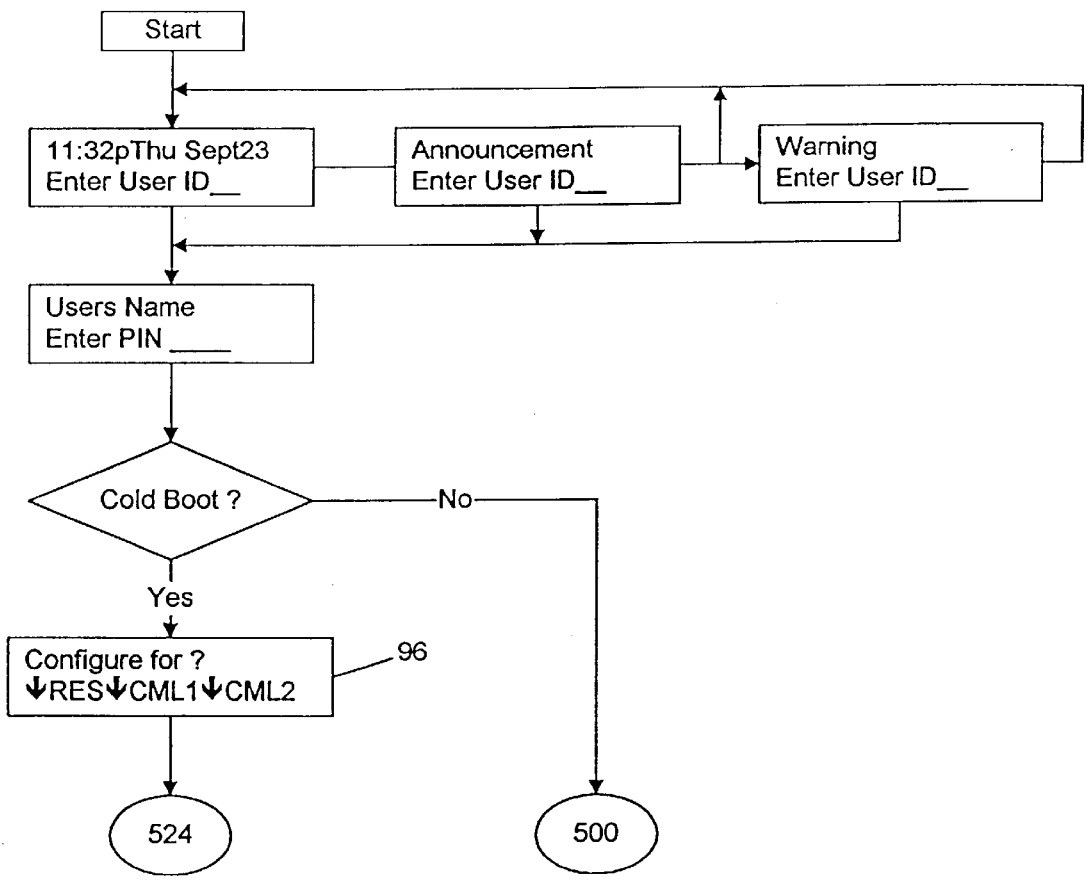
FIG. 9 shows the flow diagram illustrating how the system is accessed through the user interface during user authorization.

Having detected and initialized a user interface, the master unit originates a message to it, in this case a Form message which on receipt through the network, interface 196 causes (see FIG. 6) the system interface 198 of unit 6 to decode the message and through its interface control routines 200 to display a message on the display 96, in the form shown in the first box of the flow diagram of FIG. 9. An authorized user enters a user ID, through the keypad 98 of the user interface, the key strokes being converted into data by the routines 200 and inserted into Response messages by the system interface, the messages being sent to the master unit in response to the repeated polling of the slave unit, typically on a cycle of approximately one second, by the network controller 184. Once the user ID is entered, a similar sequence of steps involving message passing between the units 2 and 6 capture the user's Personal Identification Number (PIN). These steps are repeated until the ID and PIN of a user authorized to start the system have been captured.

If on startup the system detects that it is an unconfigured new system, the startup is considered a "cold boot" and the master unit 2 sends a Form message causing the display 96 of the unit 6 to display an initial configuration menu. In the example shown in FIG. 9, this menu provides for selection, utilizing push buttons of the keypad 98 located adjacent the display in locations indicated by the arrows in the display, whether a domestic or one of two alternative classes of commercial installation is to be configured. The primary effect of this selection is to select different sets of default configuration data for modification by the user. Provision of such default data assists the user in setting up the system.

Figure 20:
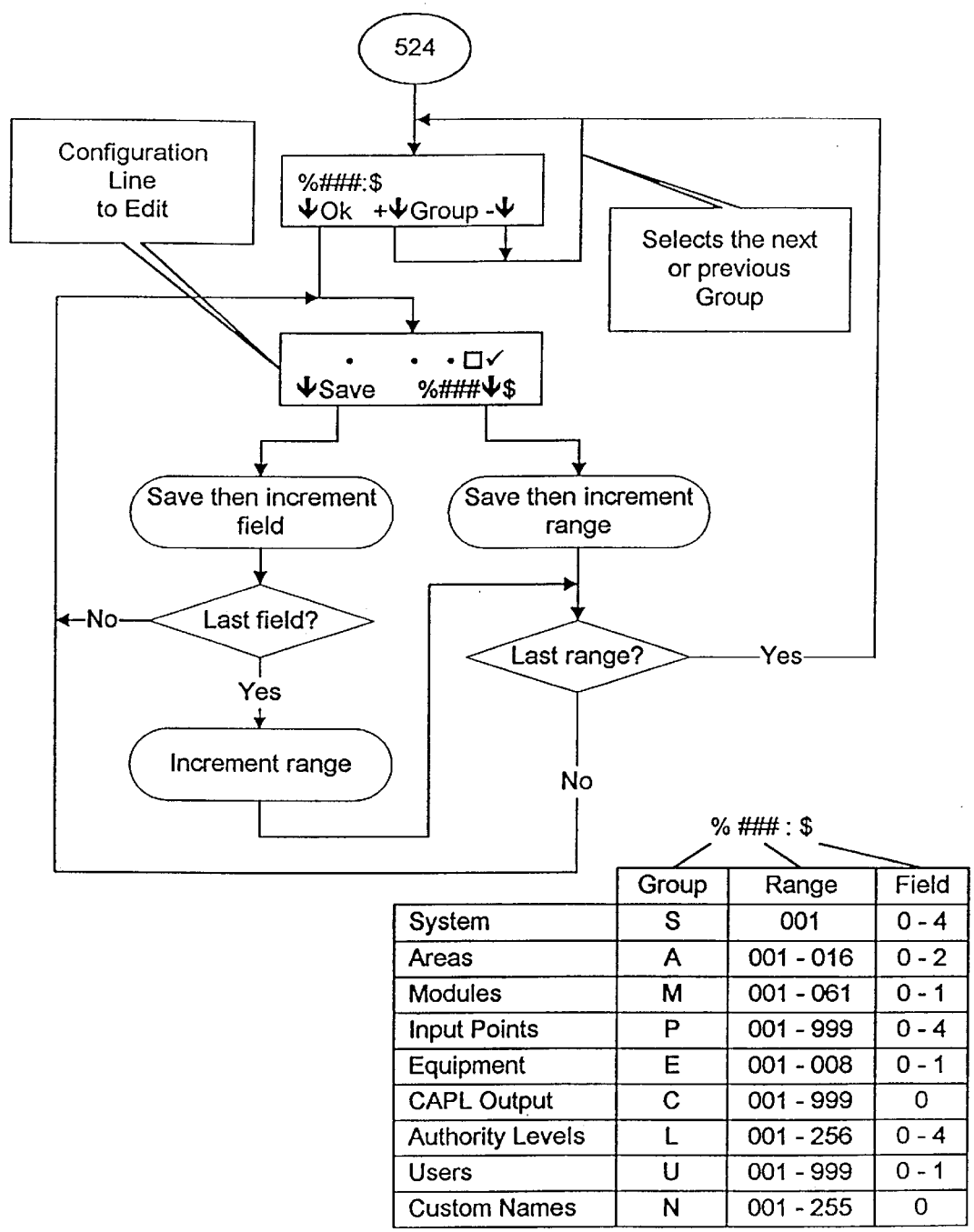
FIG. 20 shows the flow diagram illustrating how the system is accessed through the user interface during configuration.

A selection from this menu then takes execution to point 524 in the configuration routine shown in FIG. 20, in which the unit 6 receives a message causing the display 96 to display a menu identifying a line of configuration information by a three part code identifying the group of data to where the line belongs, its number within that group, and a data field within that line, as best illustrated by FIG. 20. Two adjacent buttons on keypad 98, as arrowed, allow stepping from group to group, and the third adjacent button allows selection of the displayed group for editing. Selection causes a further menu to be displayed, showing the number within the group at bottom right and the fields for editing on the top line. Of the arrowed buttons, the left button saves a field content after editing by means of the keypad and increments the field number, or if the field number is a maximum, increments the group number. The right button increments the number within the group retaining the field number. Each depression of a button sets up a menu response message for return to the master unit, which returns a form responsive to the increment signalled. When all the lines within a group have been configured, execution returns to the group selection menu for selection of a further group or entry of an exit code. It will be noted that group "M" provides for the configuration of slave units. In the case of the application slave units, the master unit will send a Menu Initialize message to the slave unit to cause the latter to generate a Form message to the master unit 2, which it then sends on to the user interface unit 6. It will thus be understood that, prior to configuration, the master unit 2 need have no knowledge of the character or capabilities of a slave unit, nor need it have any data as to the forms associated with that unit, since all such data will be provided by the slave unit itself responsive to messages received from the master unit 2.

Figure 10:
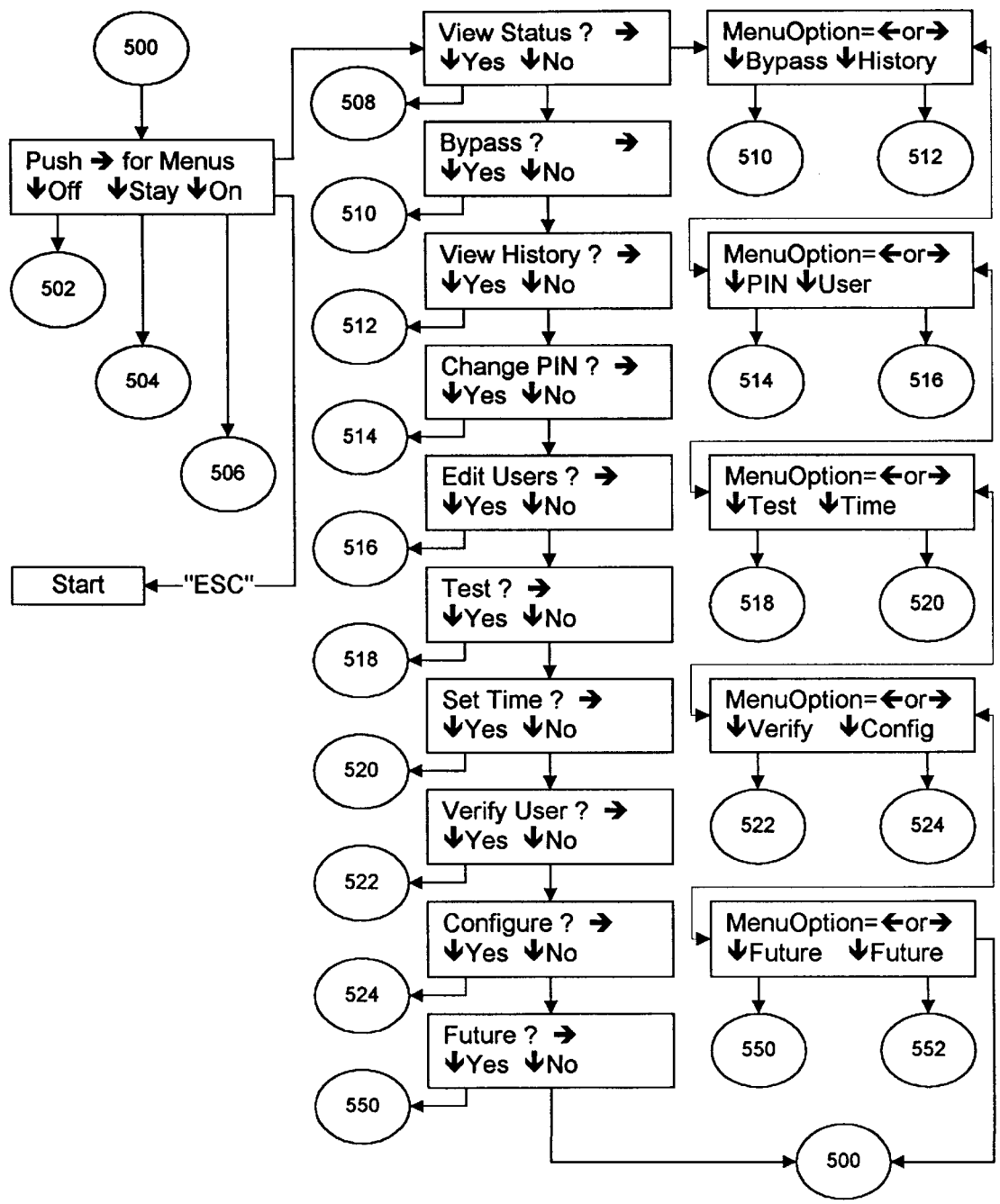
FIG. 10 shows the flow diagram illustrating how the system is accessed through the user interface during menu selection.

On completion of configuration, as signalled by use of a designated keypad button by the user, or if configuration has already been performed, execution moves to point 500 in FIG. 10. It should be understood that the user interface functions sequence being described will only occur following entry of ID and PIN data by a user using similar interface functions; in the absence of user input the master unit will repeatedly execute a main program loop as described above in which it sends poll messages in turn to each of the slave units and reviews the response messages received from anything other than acknowledge messages, as well as polling its own resources.

Figure 11:
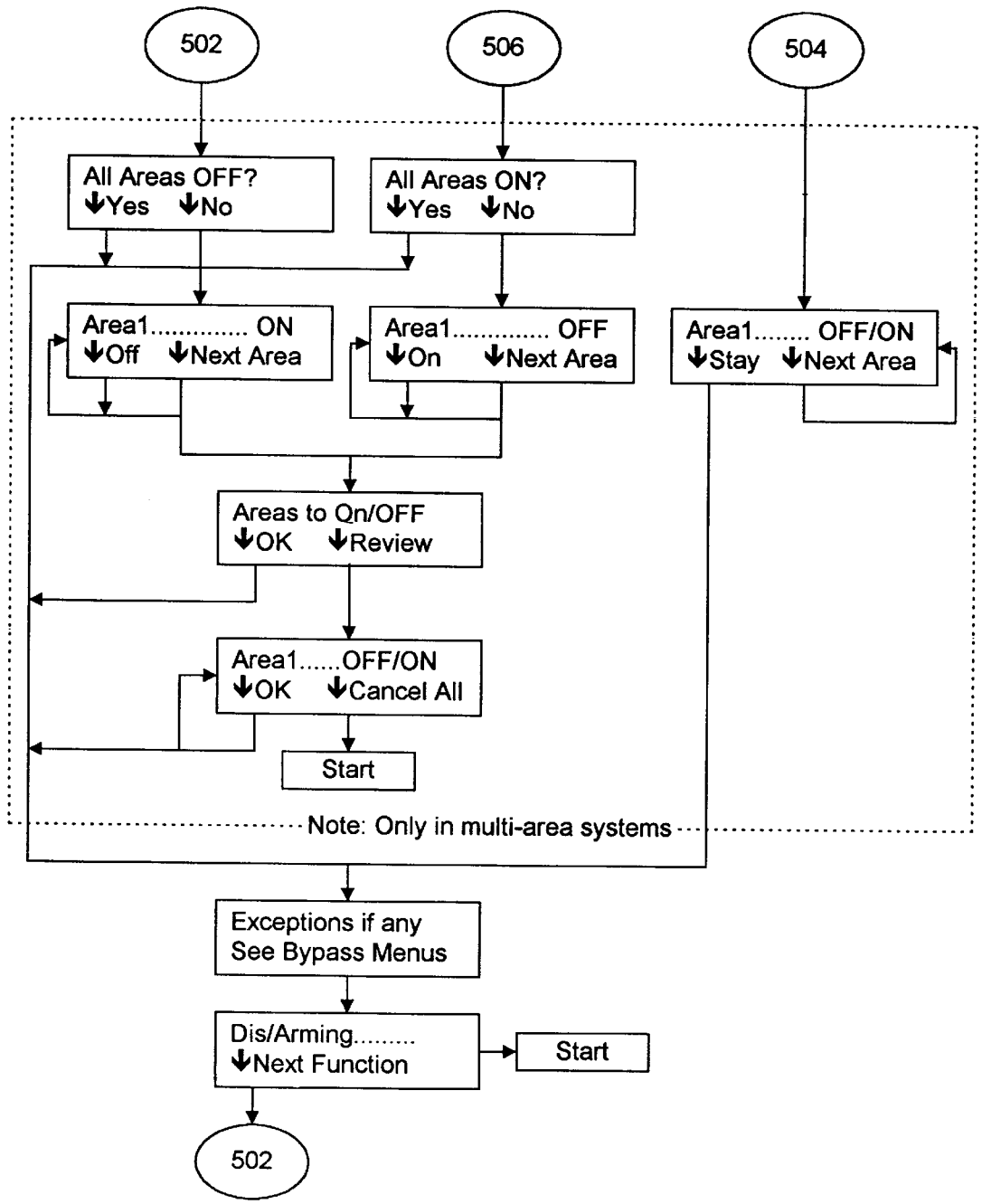
FIG. 11 shows the flow diagram illustrating how the system is accessed through the user interface while setting the area or system to off, stay or on mode.
Figure 12:
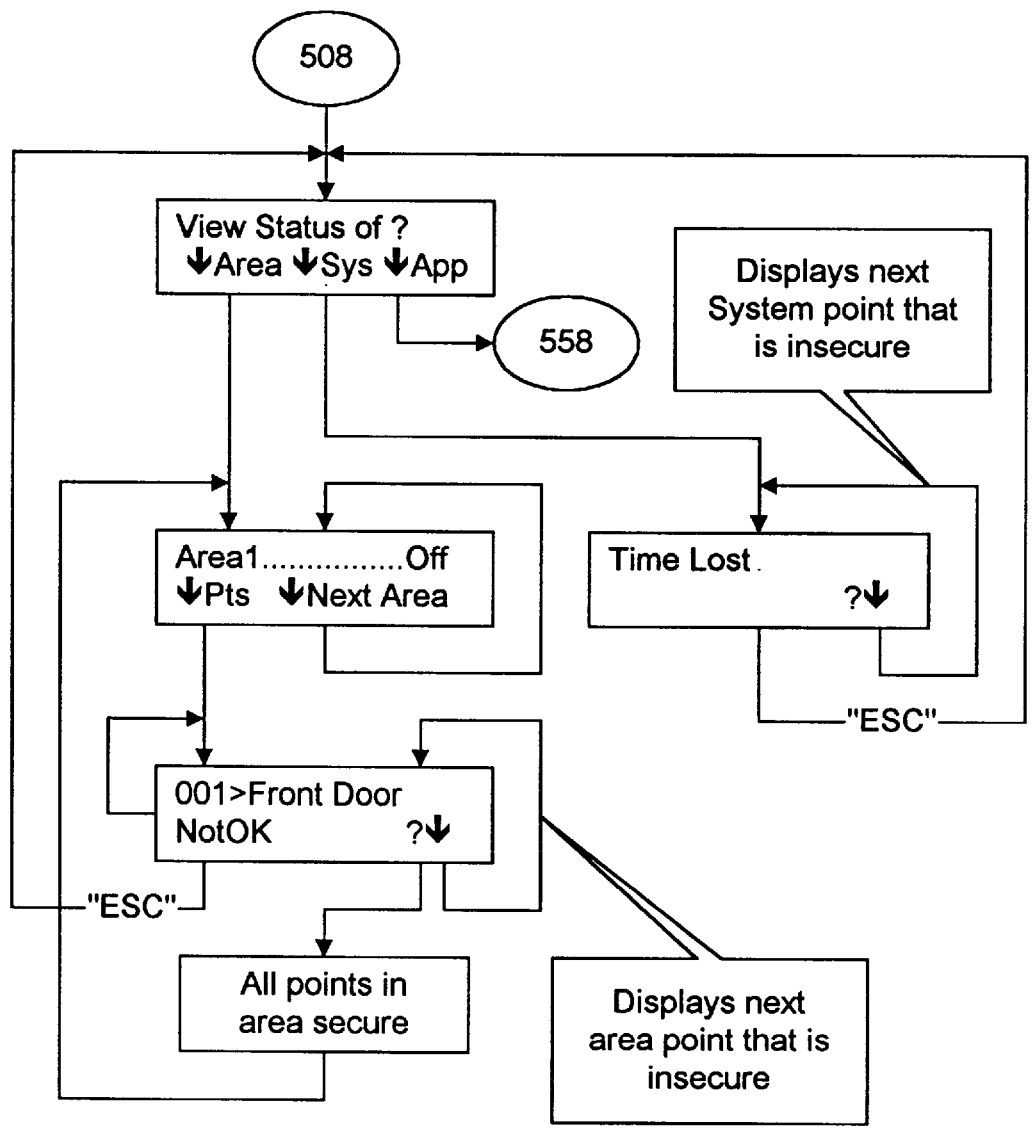
FIG. 12 shows the flow diagram illustrating how the system is accessed through the user interface during status interrogation.
Figure 13:
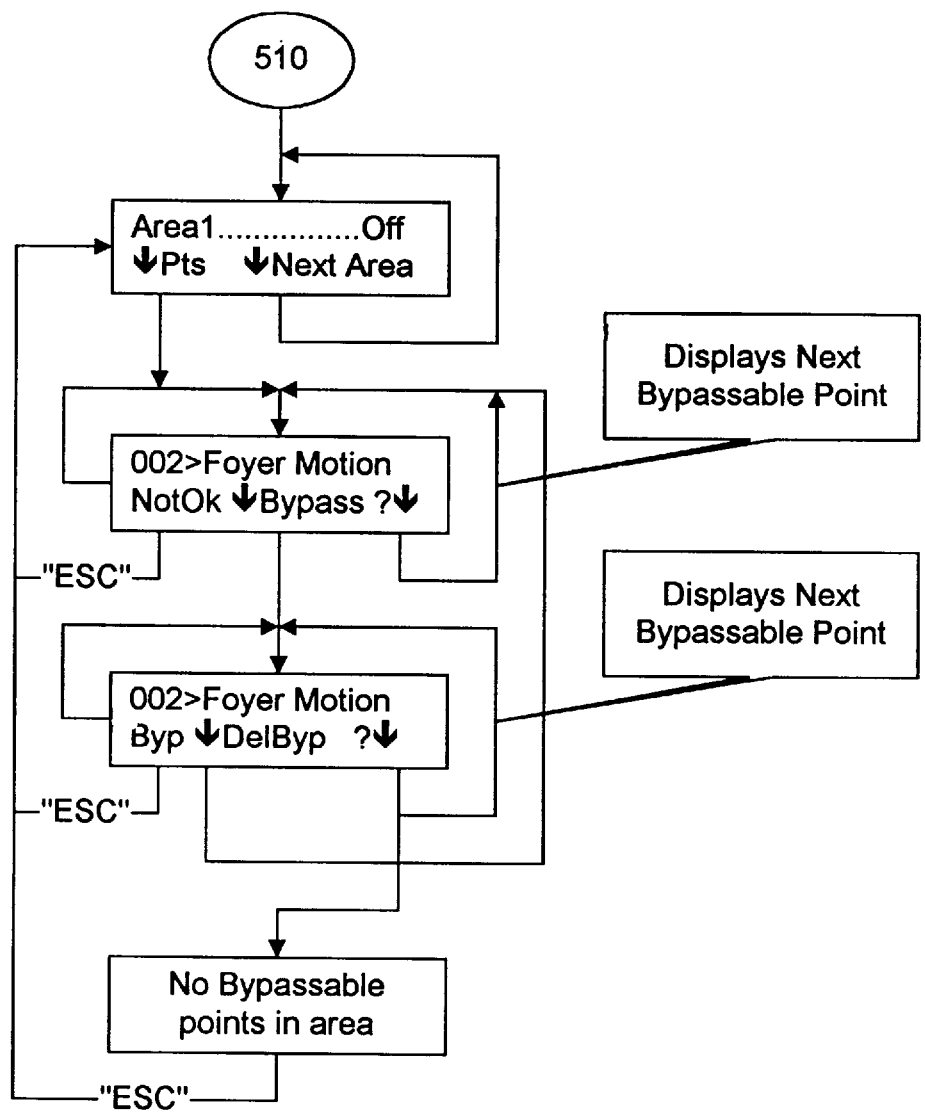
FIG. 13 shows the flow diagram illustrating how the system is accessed through the user interface during bypass selection.
Figure 14:
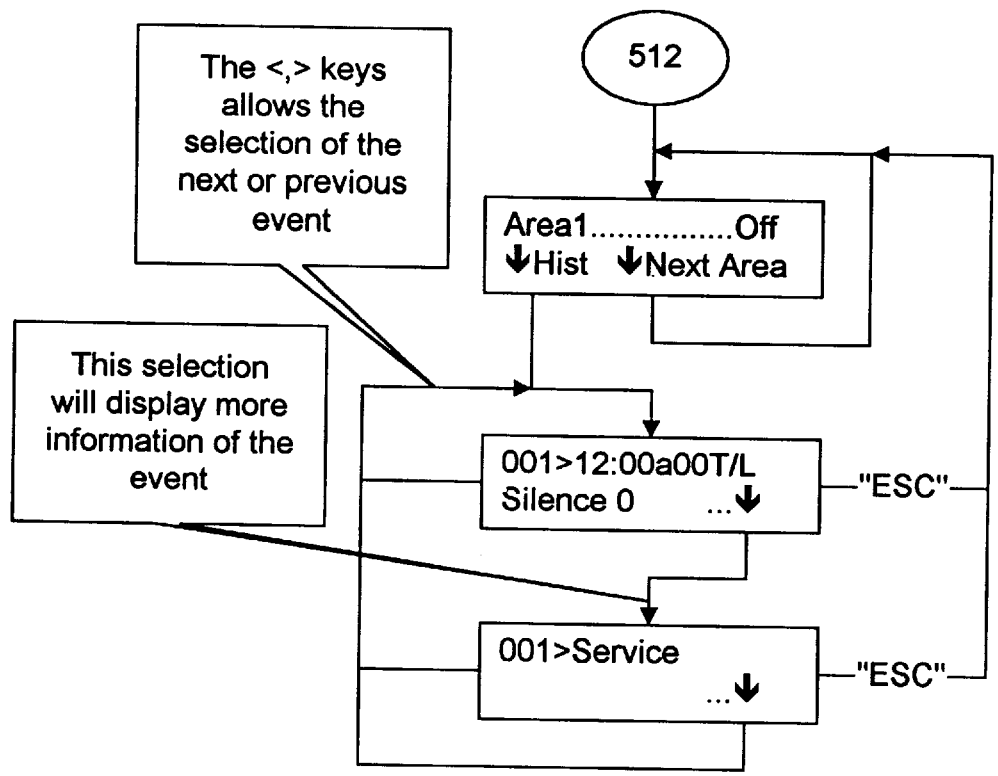
FIG. 14 shows the flow diagram illustrating how the system is accessed through the user interface during history examination.
Figure 15:
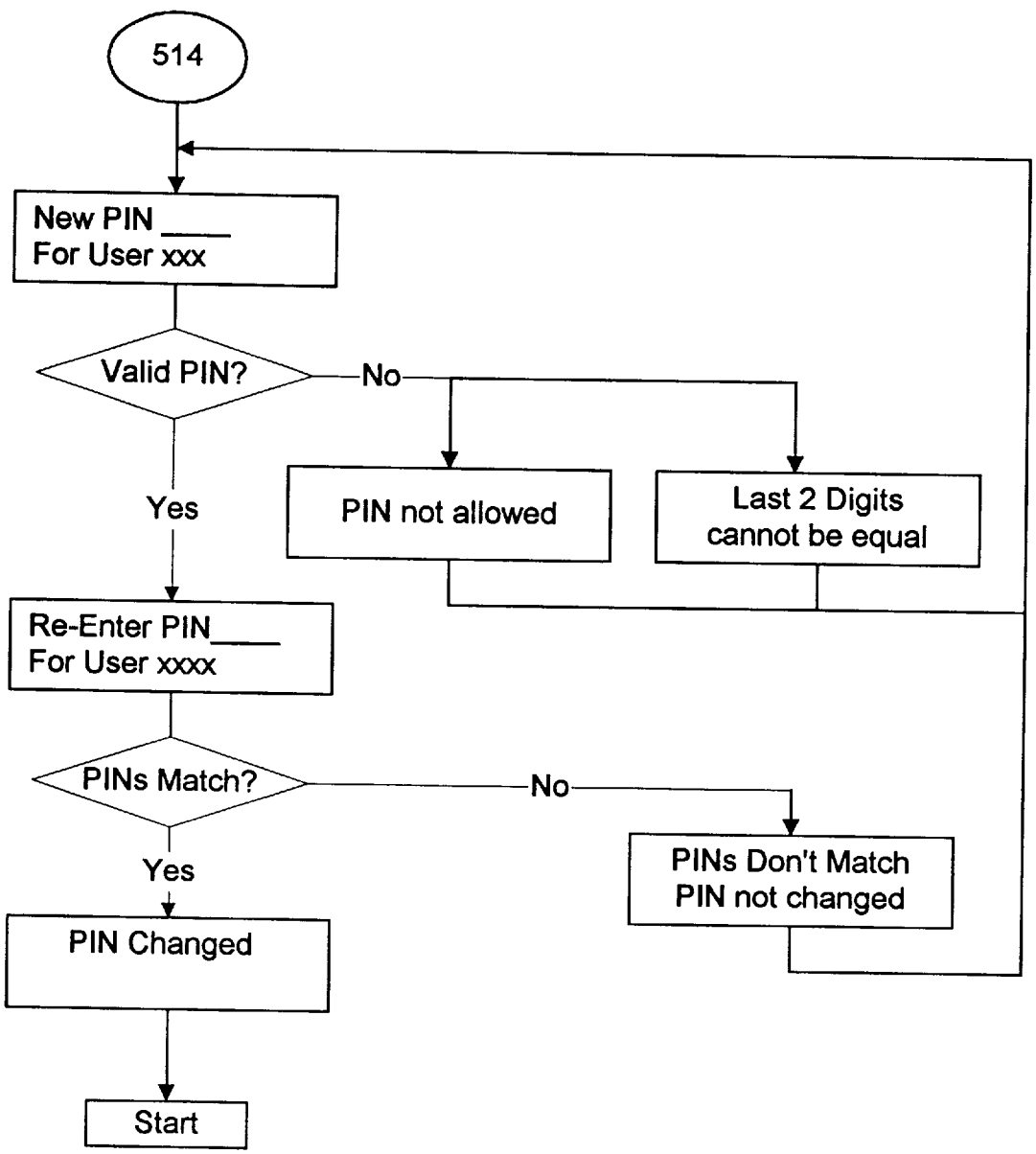
FIG. 15 shows the flow diagram illustrating how the system is accessed through the user interface for changing a user's personal identification number (PIN)
Figure 16:
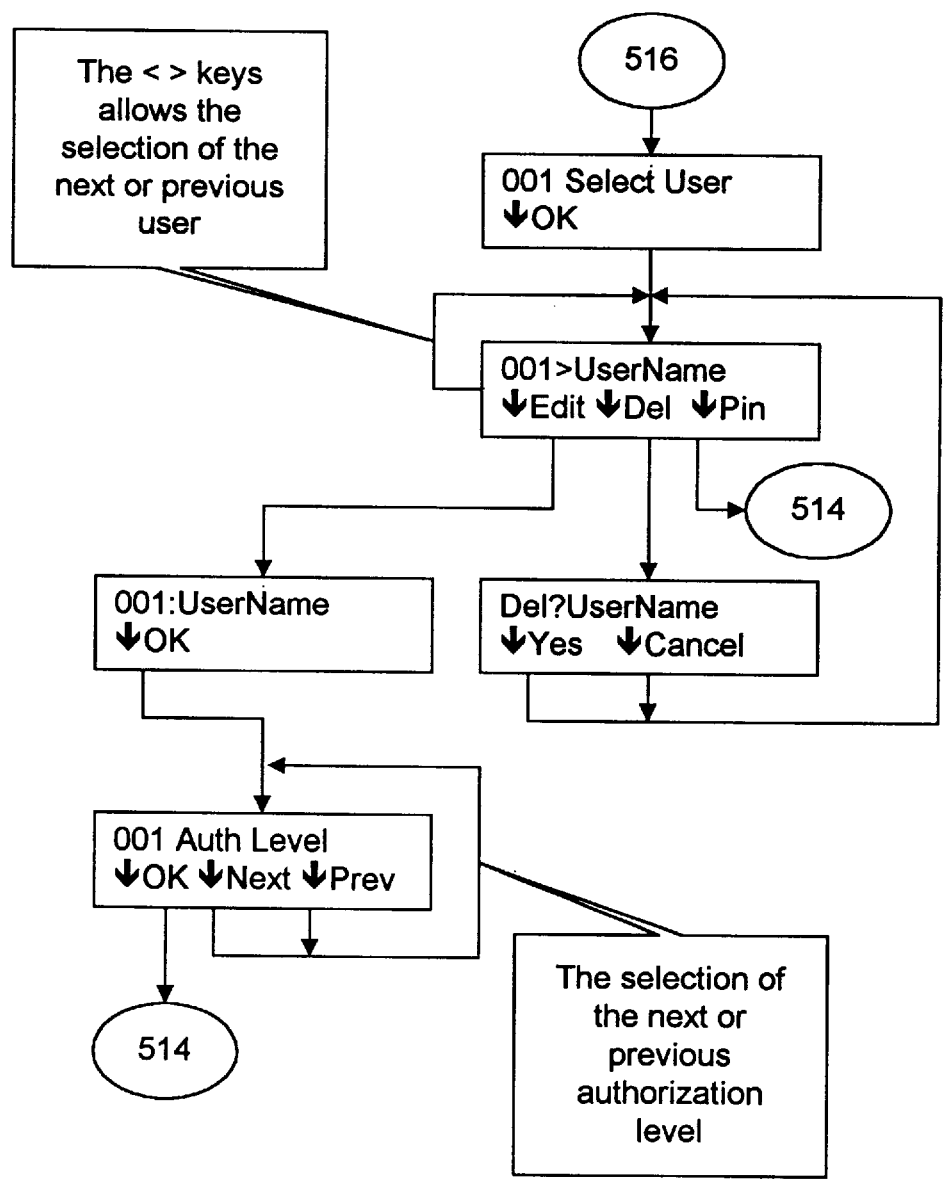
FIG. 16 shows the flow diagram illustrating how the system is accessed through the user interface for editing user information.
Figure 17:
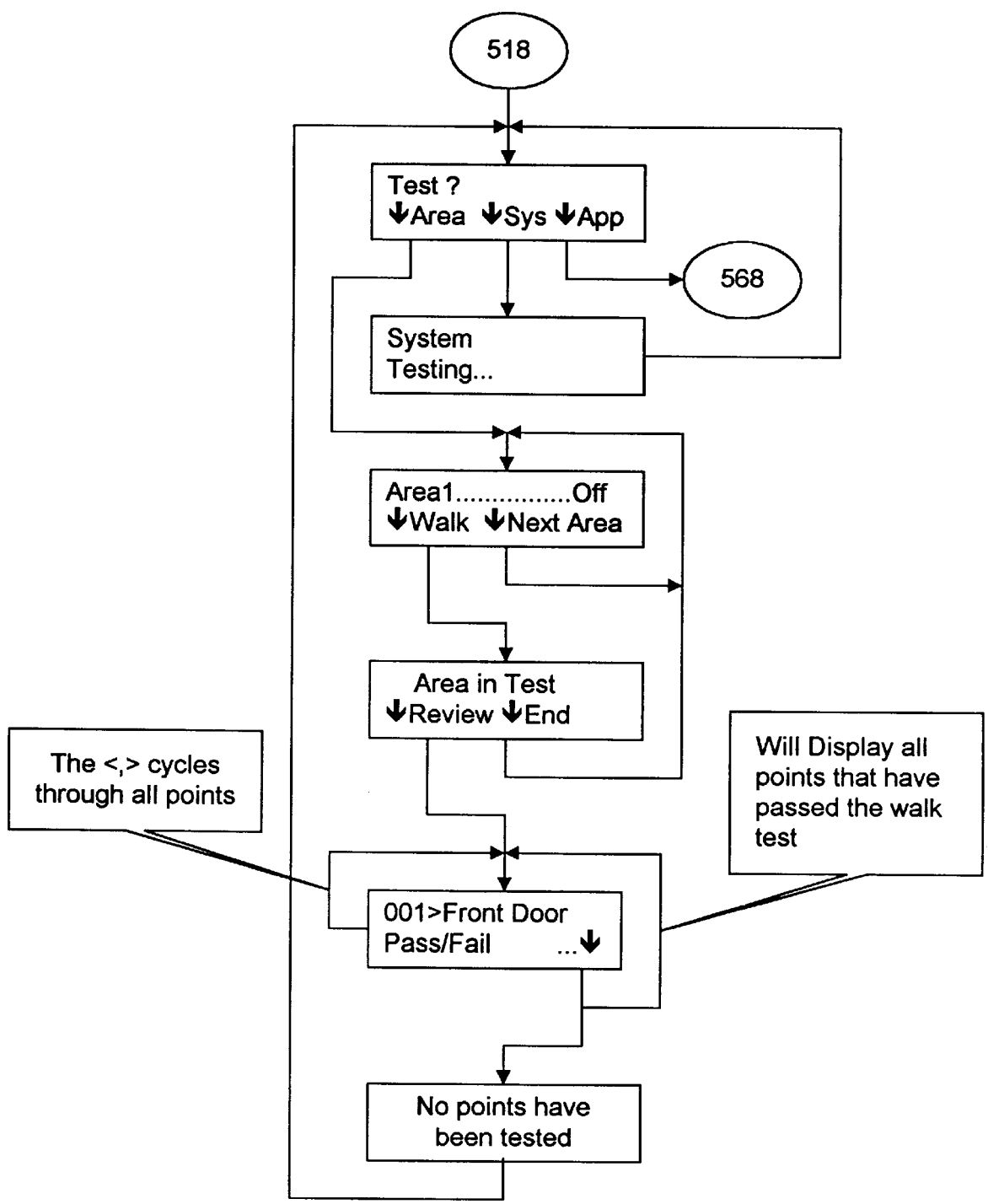
FIG. 17 shows the flow diagram illustrating how the system is accessed through the user interface during test activation.
Figure 18:
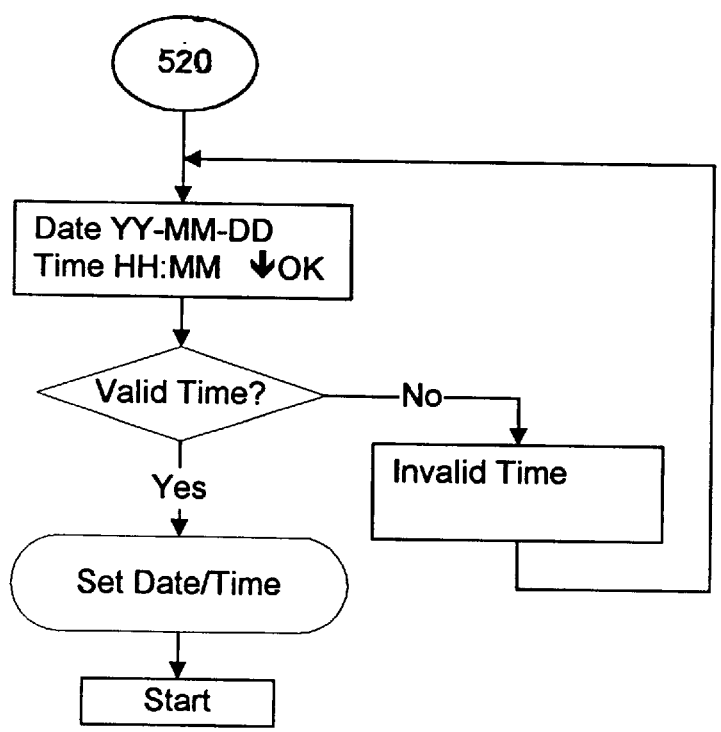
FIG. 18 shows the flow diagram illustrating how the system is accessed through the user interface whenever the time is set.
Figure 19:
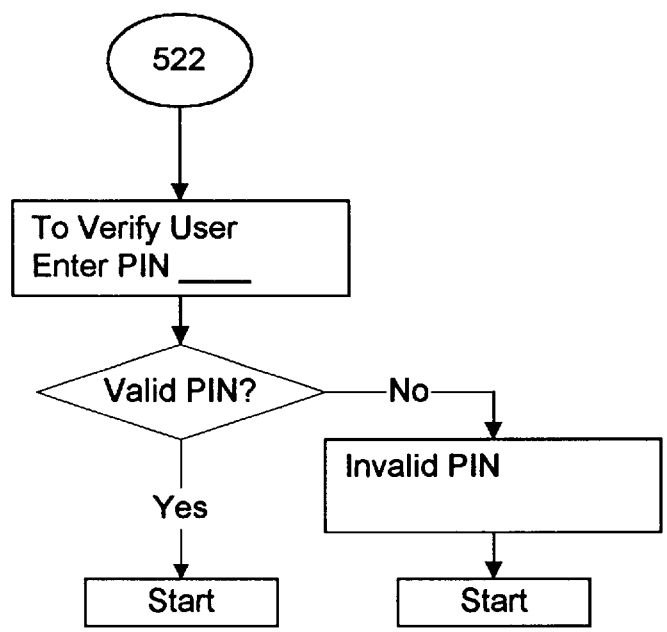
FIG. 19 shows the flow diagram illustrating how the system is accessed through the user interface during user verification.

It will be understood that in describing the menus, messages will be sent by the master unit 2 to the slave units (including the user interface units) and responses received from the slave units in order to perform the required functions, but for simplicity such exchanges will not henceforward be discussed: instead, only the menus displayed on the unit 6 will be discussed. The menu displayed after reaching point 500 will depend on what areas of the system are already turned on. In a single area system, in which the points being monitored are not divided into areas, the system is either ON, in STAY or OFF, and the steps contained in the dotted line box in FIG. 11 are not displayed. According to the button pressed, subsequent menus provide for turning areas on, to stay or off, reviewing their status, or leaving them unchanged as the case may be, before exiting to the start point of the diagram of FIG. 9.

FIG. 10 illustrates one route by which menu sequences for performing different user functions may be reached by pressing the right arrow key after reaching screen 500. Selection of the NO response in the box on the left also brings up successive menus for providing alternative access to the various functions 502–524, 550 and 552, but it is thought redundant to describe these alternative sequences in detail. The menu sequences for the different functions 502–524 are shown in FIGS. 12 through 19 and are believed self-explanatory in the light of the foregoing description. It should also be noted that only a subset of the menus shown in FIG. 10 for which a logged-in user is authorized would be displayed. An ESCAPE key is provided on the keypad to allow the user to escape from the menu structure.

It should be further noted from FIG. 10 that expansion of the regular menus (as described in FIG. 10) to accommodate expansion for future applications is accomplished with selections of screens 550 and 552 which will be application specific and as such will be dependent on the application, subject to the principles already described. Other supplementary application menu selections may be found in FIG. 12, screen 558 and in FIG. 17, screen 558. Again, because they are application specific, they are not described but are shown for the sake of completeness, and to illustrate how the applications menu interface from the master unit's menuing system may be expanded.

It will be understood that the foregoing description of a presently preferred embodiment of the invention is by way of example only, and that many variations in implementation are possible within the scope of the appended claims.

I claim:

1. A security or automation system for domestic or business premises comprises plural intercommunicating units, each having its own microprocessor and at least some of the units managing resources useful to the system, the units being connected into a network by a communication bus, the system comprising a master unit and at least one slave unit; the at least one slave unit including at least one user interface unit which is located remote from the master unit and which provides a user interface to the system for entry of commands and data and the display of data; the resources of at least one unit in the system comprising sensor inputs and control outputs for implementing security or automation; the microprocessor of the master unit being programmed to manage communications between units comprised in the system over the communication bus, according to a protocol consisting of the passage of addressed messages over the bus by or via the master unit to any of the slave units and the passage of addressed messages by the slave units to or via the master unit over the bus in response to such messages; the microprocessor of each unit which has resources being programmed to manage and report on its own resources according to data exchanged in messages passed over the network between a user interface unit and the unit managing the resources, the passage of messages being under control of the master unit, and being programmed to generate messages containing data requests and reports in a form at manageable by the master unit and interpretable by a user interface but having a content dependent on the resources managed, the system including at least one user interface unit provided with a visual display and data entry means, the visual display being capable of displaying forms requesting the entry of data by the data entry means, and the microprocessor of said user interface unit being programmed to format the data received in a message for display, and data entered into messages for passage to the master unit.

2. A system according to claim 1, wherein the microprocessor of the master unit is programmed to poll each slave unit for messages at regular intervals, to route messages received as a result of such polling to units to which they are addressed, and to process messages addressed to itself.

3. A system according to claim 2, wherein the microprocessor of the master unit is programmed to provide a command interpreter operable to process commands received in messages from slave units, and to return to the slave units data generated by processing of the commands.

4. A system according to claim 1, including a user interface unit whose microprocessor is programmed to construct forms for display from data received in a message from a second unit.

5. A security or automation system for domestic or business premises comprises plural intercommunicating units, each having its own microprocessor and at least some of the units managing resources useful to the system, the units being connected into a network by a communication bus, the system comprising a master unit and at least one slave unit; the at least one slave unit including at least one user interface unit which is located remote from the master unit and which provides a user interface to the system for entry of commands and data and the display of data; the resources of at least one unit in the system comprising sensor inputs and control outputs for implementing security or automation; the microprocessor of the master unit being programmed to manage communications between units comprised in the system over the communication bus, according to a protocol consisting of the passage of addressed messages over the bus by or via the master unit to any of the slave units and the passage of addressed messages by the slave units to or via the master unit over the bus in response to such messages; the microprocessor of each unit which has resources being programmed to manage and report on its own resources according to data exchanged in messages passed over the network between a user interface unit and the unit managing the resources, the passage of messages being under control of the master unit;

wherein each unit managing resources is programmed to generate messages containing data requests and reports in a form interpretable by a user interface but having a content dependent upon the resources managed;

the units including at least one user interface unit provided with a visual display and data entry means, the visual display being capable of displaying forms requesting the entry of data by the data entry means, and the microprocessor of said user interface unit being programmed to format the data received in a message for display, to format data entered into messages for passage to the master unit, and to construct forms for display from data received in a message from a second unit; and wherein the second unit is a slave unit implementing an application, the second unit requiring to receive data input from or display forms appropriate to the application on the user interface unit, and wherein the microprocessor of the second unit is programmed to generate messages which will be interpreted by the user interface unit to construct and present forms requesting data input or displaying data appropriate to the application.

* * * * *